(12) United States Patent
Abedini et al.

(10) Patent No.: US 12,219,524 B2
(45) Date of Patent: Feb. 4, 2025

(54) BEAM DIRECTION ASSISTED PAGING IN WIRELESS COMMUNICATION

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/576,429

(22) Filed: Jan. 14, 2022

(65) Prior Publication Data

US 2023/0232367 A1     Jul. 20, 2023

(51) Int. Cl.
*H04W 68/00*     (2009.01)
*H04W 16/28*     (2009.01)
*H04W 56/00*     (2009.01)

(52) U.S. Cl.
CPC ......... *H04W 68/005* (2013.01); *H04W 16/28* (2013.01); *H04W 56/001* (2013.01)

(58) Field of Classification Search
CPC .. H04W 68/005; H04W 16/28; H04W 56/001
USPC ................ 370/329, 328, 338, 341, 345, 350
See application file for complete search history.

(56) References Cited

U.S. PATENT DOCUMENTS

2019/0182800 A1    6/2019    Park et al.
2020/0404620 A1*   12/2020   Sang .................... H04W 24/10

FOREIGN PATENT DOCUMENTS

WO    WO 2018000319 A1 *   1/2018
WO    2019169359 A1        9/2019
WO    2022005055 A1        1/2022

OTHER PUBLICATIONS

International Search Report and Written Opinion—PCT/US2023/010424—ISA/EPO—Apr. 24, 2023.

* cited by examiner

*Primary Examiner* — Nghi H Ly
(74) *Attorney, Agent, or Firm* — Loza & Loza, LLP

(57) ABSTRACT

Beam-related paging assistance information can be exchanged between a core network, radio access networks, and user equipment. Beam-related paging assistance information can enable more efficient paging operations at a base station. A centralized unit (CU) of a base station can exchange beam-related paging assistance information with a distributed unit (DU) of the base station to facilitate paging operations using the beam-related paging assistance information.

22 Claims, 17 Drawing Sheets

BEAM DIRECTION ASSISTED PAGING IN WIRELESS COMMUNICATION

TECHNICAL FIELD

The technology discussed below relates generally to wireless communication systems, and more particularly, to user equipment paging using beam-related paging assistance information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. In 5G, beamforming techniques can be used to improve coverage and signal strength. Further, a 5G network can page a user equipment using beamforming for better efficiency.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure provide various techniques for communicating beam-related paging assistance information between a centralized unit (CU) and a distributed unit (DU) of a base station to facilitate paging using the beam-related paging assistance information. Beam-related paging assistance information can enable more efficient paging operations at a base station.

One aspect of the disclosure provides a base station associated with a first radio access network (RAN) for wireless communication. The base station includes a transceiver, a memory, and a processor coupled to the transceiver and the memory. The processor and the memory are configured to receive first beam-related paging assistance information (BPAI) regarding a first user equipment (UE). The first BPAI includes information indicating a potential location of the first UE. The processor and the memory are further configured to communicate the first BPAI to a distributed unit (DU) of the base station for paging the first UE. The processor and the memory are further configured to page the first UE in the potential location based at least in part on the first BPAI.

One aspect of the disclosure provides a method of wireless communication at a base station associated with a first radio access network (RAN). The method includes receiving first beam-related paging assistance information (BPAI) regarding a first user equipment (UE). The first BPAI includes information indicating a potential location of the first UE. The method further includes communicating the first BPAI to a distributed unit (DU) of the base station for paging the first UE. The method further includes paging the first UE in the potential location based at least in part on the first BPAI.

One aspect of the disclosure provides a core network node for wireless communication. The core network node includes a memory and a processor coupled to the memory. The processor and the memory are configured to receive, from a first radio access network (RAN), first beam-related paging assistance information (BPAI) regarding a user equipment (UE). The first BPAI includes at least one of: one or more transmission and reception points (TRPs); one or more synchronization signal block (SSB) indices; or one or more SSB beams. The processor and the memory are further configured to transmit, to a second RAN, a paging request to page the UE in a potential location based at least in part on the first BPAI.

One aspect of the disclosure provides a method of wireless communication at a core network node. The method includes receiving, from a first radio access network (RAN), first beam-related paging assistance information (BPAI) regarding a user equipment (UE). The first BPAI includes at least one of: one or more transmission and reception points (TRPs); one or more synchronization signal block (SSB) indices; or one or more SSB beams. The method further includes transmitting, to a second RAN, a paging request to page the UE in a potential location based at least in part on the first BPAI.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while examples may be discussed below as device, system, or method implementations, it should be understood that such examples can be implemented in various devices, systems, and methods.

DETAILED DESCRIPTION

Figure 1:
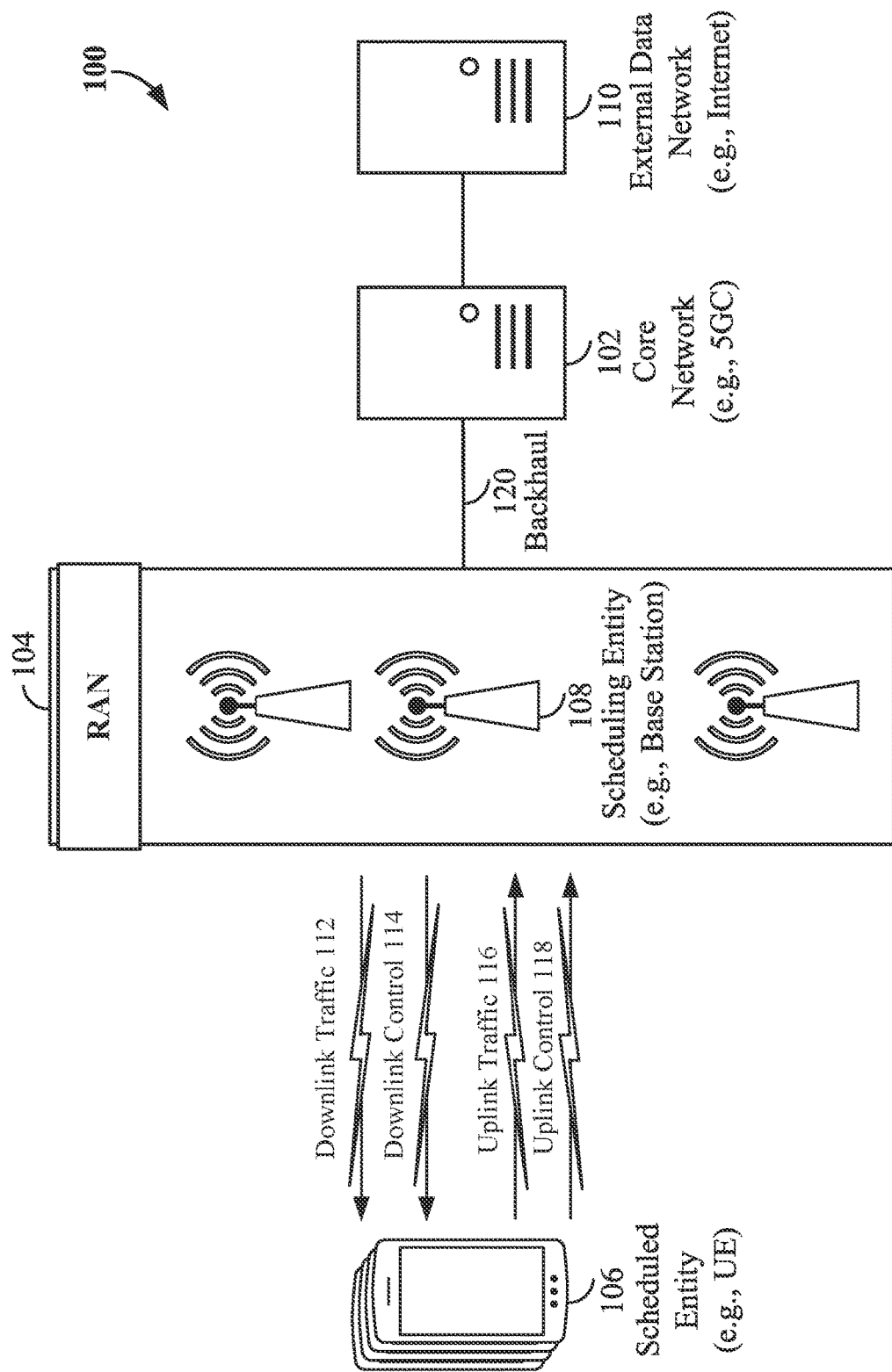
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects of the disclosure relate to various paging procedures in a wireless network using beam-related paging assistance information. Beam-related paging assistance information can be exchanged between a core network, radio access networks, and user equipment. Beam-related paging assistance information enables more efficient paging operations at a base station. Some aspects of the disclosure provide various techniques for communicating beam-related paging assistance information between a centralized unit (CU) and a distributed unit (DU) of a base station to facilitate paging using the beam-related paging assistance information.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below, e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
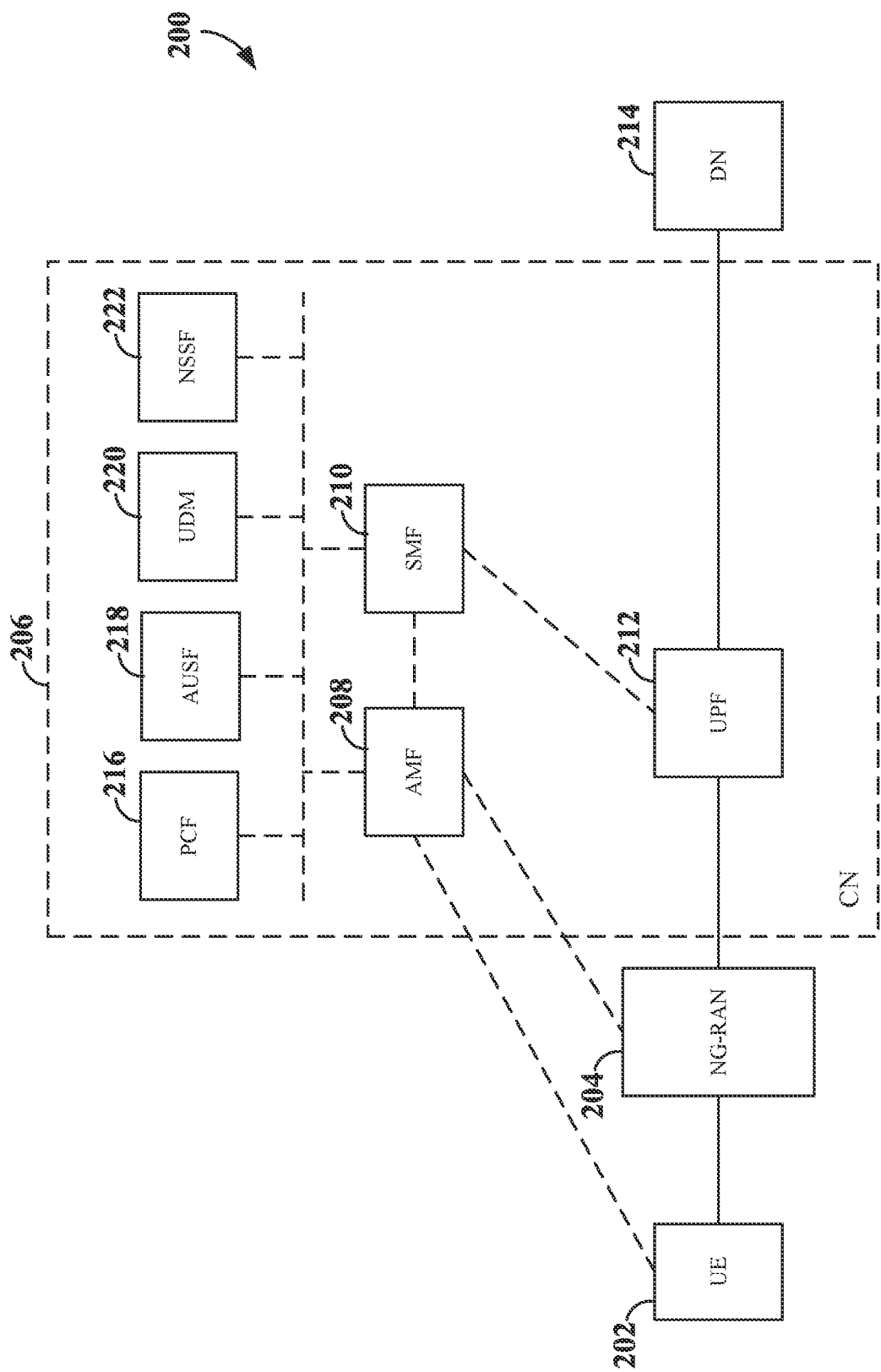
FIG. 2 is a block diagram illustrating an example of a 5G wireless communication system (5GS) according to some aspects.

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a next generation radio access network (NG-RAN) 204, and a core network 206. By virtue of the wireless communication system 200, the UE 202 may be enabled to carry out data communication with an external data network 214, such as (but not limited to) the Internet, Ethernet network, or a local area network.

The core network 206 may be a 5G core network and may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NG-RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NG-RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NG-RAN 204, the UE 202 may transmit a registration request and PDU session establishment request to the 5G core network 206 via the NG-RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
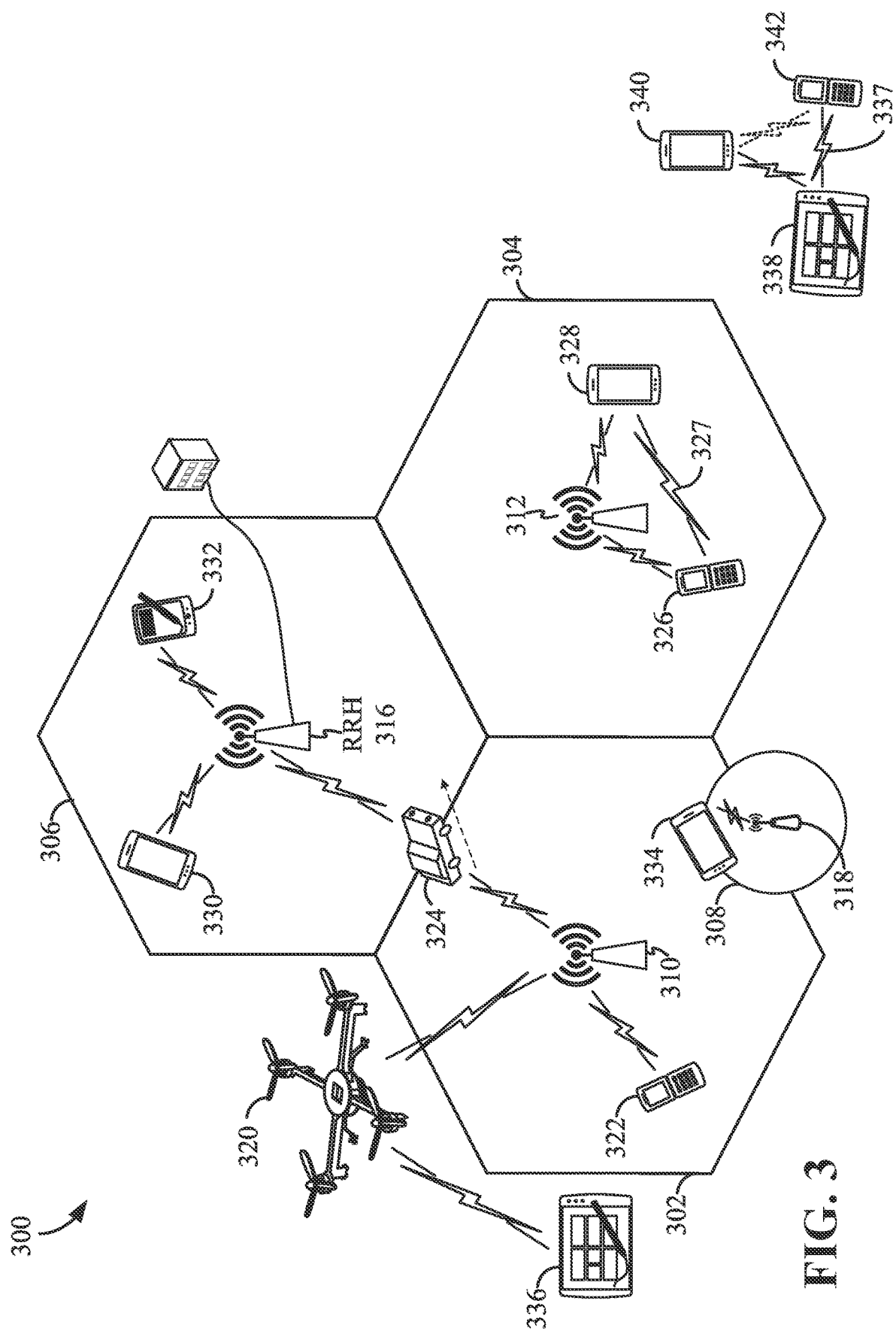
FIG. 3 is an illustration of an exemplary radio access network (RAN) according to some aspects.

FIG. 3 is a diagram illustrating an exemplary radio access network 300 according to some aspects. In some examples, the radio access network (RAN) 300 may be the same as the RAN 104 described above and illustrated in FIG. 1 and/or the NG-RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates cells 302, 304, 306, and 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion (e.g., one or more sectors) of the cell.

Various base station arrangements can be utilized. For example, in FIG. 3, two base stations, base station 310 and base station 312 are shown in cells 302 and 304. A third base station, base station 314 is shown controlling a remote radio head (RRH) 316 in cell 306. That is, a base station can have an integrated antenna or can be connected to an antenna or RRH 316 by feeder cables. In the illustrated example, cells 302, 304, and 306 may be referred to as macrocells, as the base stations 310, 312, and 314 support cells having a large size. Further, a base station 318 is shown in the cell 308, which may overlap with one or more macrocells. In this example, the cell 308 may be referred to as a small cell (e.g., a microcell, picocell, femtocell, home base station, home Node B, home eNode B, etc.), as the base station 318 supports a cell having a relatively small size. Cell sizing can be done according to system design as well as component constraints. In the RAN 300, the macrocells and microcells, and RRH can provide multiple TRPs.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes an unmanned aerial vehicle (UAV) 320, which may be a quadcopter or drone. The UAV 320 may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 102/206 (see FIG. 1 or FIG. 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 106 described above and illustrated in FIG. 1.

In some examples, the UAV 320 (e.g., quadcopter) may be configured to function as a UE. For example, the UAV 320 may operate within cell 302 by communicating with base station 310.

In a further aspect of the RAN 300, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 338, 340, and 342) may communicate with each other using sidelink signals 337 without relaying that communication through a base station. In some examples, the UEs 338, 340, and 342 may each function as a scheduling entity or transmitting sidelink device and/or a scheduled entity or a receiving sidelink device to schedule resources and communicate sidelink signals 337 therebetween without relying on scheduling or control information from a base station. In other examples, two or more UEs (e.g., UEs 326 and 328) within the coverage area of a base station (e.g., base station 312) may also communicate sidelink signals 327 over a direct link (sidelink) without conveying that communication through the base station 312. In this example, the base station 312 may allocate resources to the UEs 326 and 328 for the sidelink communication.

In some examples, a D2D relay framework may be included within a cellular network to facilitate relaying of communication to/from the base station 312 via D2D links (e.g., sidelinks 327 or 337). For example, one or more UEs (e.g., UE 328) within the coverage area of the base station 312 may operate as relaying UEs to extend the coverage of the base station 312, improve the transmission reliability to one or more UEs (e.g., UE 326), and/or to allow the base station to recover from a failed UE link due to, for example, blockage or fading.

In various aspects of the disclosure, the RAN 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the radio access network 300. Each of the cells may measure a strength of the pilot signal, and the radio access network (e.g., one or more of the base stations 310 and 314/316 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may hand over the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 300 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 300 may utilize one or more multiplexing and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the RAN 300 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G New Radio (NR) specifications, user data may be coded in various manners. In some aspects, some data can be coded using quasi-cyclic low-density parity check (LDPC) with two different base graphs: one base graph is used for large code blocks and/or high code rates, while the other base graph is used otherwise. In some examples, control information and the physical broadcast channel (PBCH) may be coded using Polar coding, based on nested sequences. For these channels, puncturing, shortening, and repetition may be used for rate matching. Aspects of the present disclosure may be implemented utilizing any suitable channel coding techniques. Various implementations of scheduling entities 108 and scheduled entities 106 may include suitable hardware and capabilities (e.g., an encoder, a decoder, and/or a CODEC) to utilize one or more of these channel codes for wireless communication.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
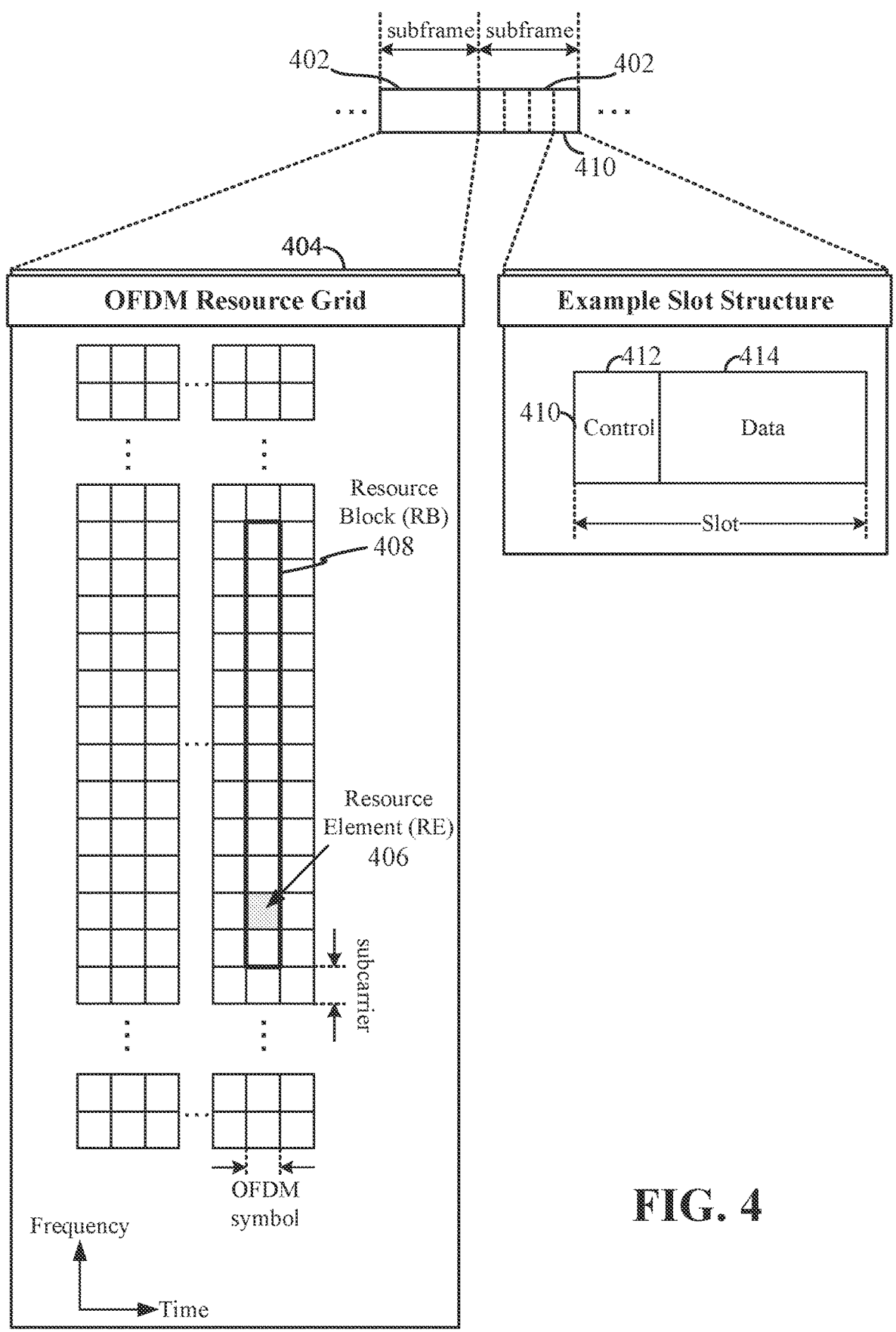
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar devices) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open-loop power control parameters and/or one or more closed-loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission. The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

The radio protocol architecture for a radio access network, such as the RAN 104 shown in FIG. 1 and/or the RAN 300 shown in FIG. 3, may take on various forms depending on the particular application. An example of a radio protocol architecture for the user and control planes is illustrated FIG. 5.

Figure 5:
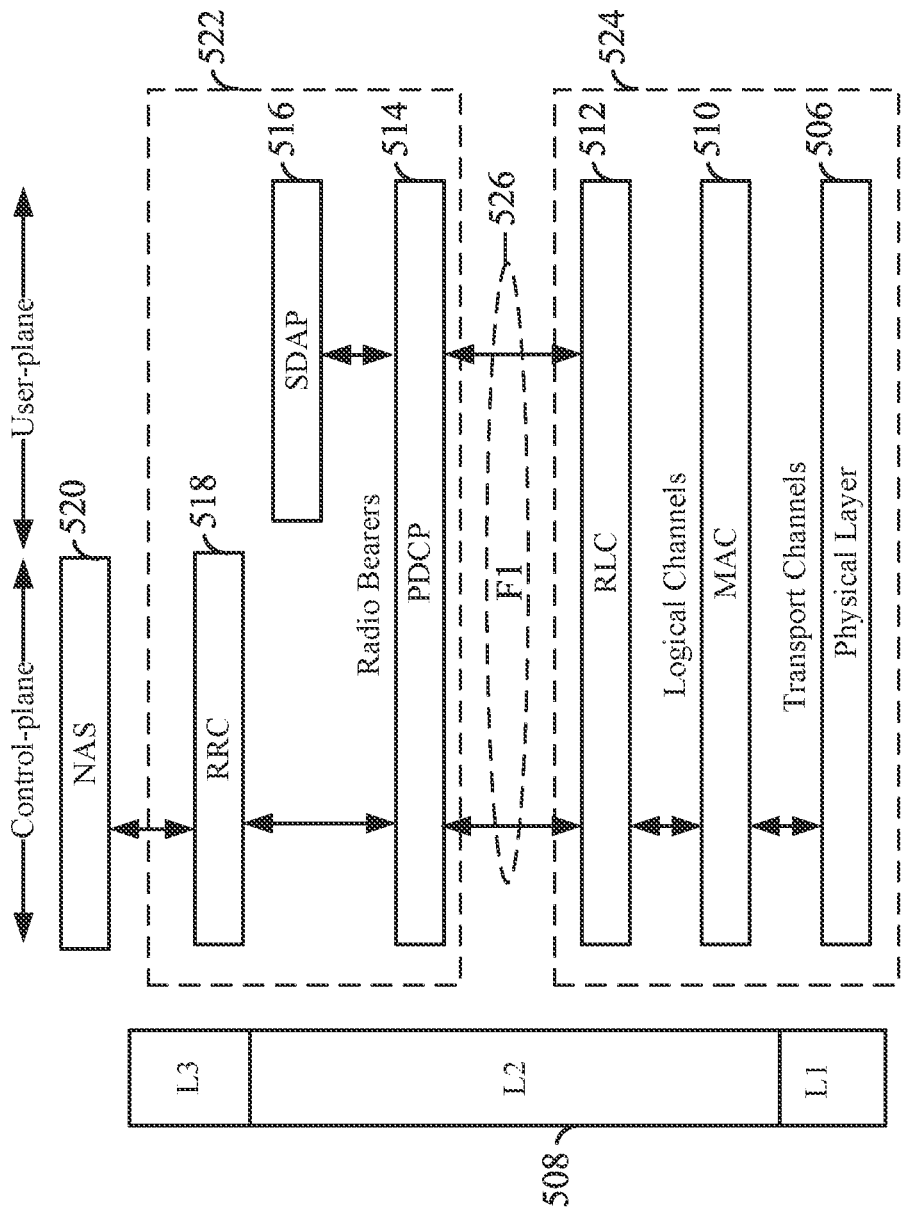
FIG. 5 is a schematic illustration of a radio protocol architecture for wireless communication according to some aspects.

As illustrated in FIG. 5, the radio protocol architecture for wireless communication includes three layers: layer 1 (L1), layer 2 (L2), and layer 3 (L3). L1 is the lowest layer and implements various physical layer signal processing functions. L1 will be referred to herein as the physical layer (PHY) 506. L2 508 is above the physical layer 506 and is responsible for the link between the UE and base station over the physical layer 506.

In the user plane, the L2 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC 102) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer (PHY) 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L3 and a higher Non Access Stratum (NAS) layer 520. The RRC layer 518 is responsible for establishing and configuring signaling radio bearers (SRBs) and data radio bearers (DRBs) between the base station the UE(s), paging initiated by the 5GC or NG-RAN (e.g., core network 102), and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

In a 5G RAN (e.g., RAN 104 or 300), a base station (e.g., a gNB or scheduling entity) can split into different physical and/or logical entities, for example, a centralized unit (CU) 522 and one or more distributed units (e.g., distributed unit (DU) 524). In some examples, a CU may be referred to as a gNB-CU, and a DU may be referred to as a gNB-DU. In some aspects, the DU 524 can operate on the lower layers, for example, RLC 512, MAC 510, and parts of PHY 506. The CU 522 can operate on the upper layers, for example, RRC 518, SDAP 516, and PDCP 514. The CU 522 is mainly responsible for non-real-time higher L2 and L3 functions (e.g., RRC, PDCP protocol stack functions). In some examples, one CU may control multiple DUs. For example, each DU can support one or more cells. The DU 524 is responsible for the real-time layer (e.g., L 1 or PHY 506) and lower L2 which can include the data link layer and scheduling function. In some aspects, the CU and DU can communicate with each other through an F1 interface 526.

Figure 6:
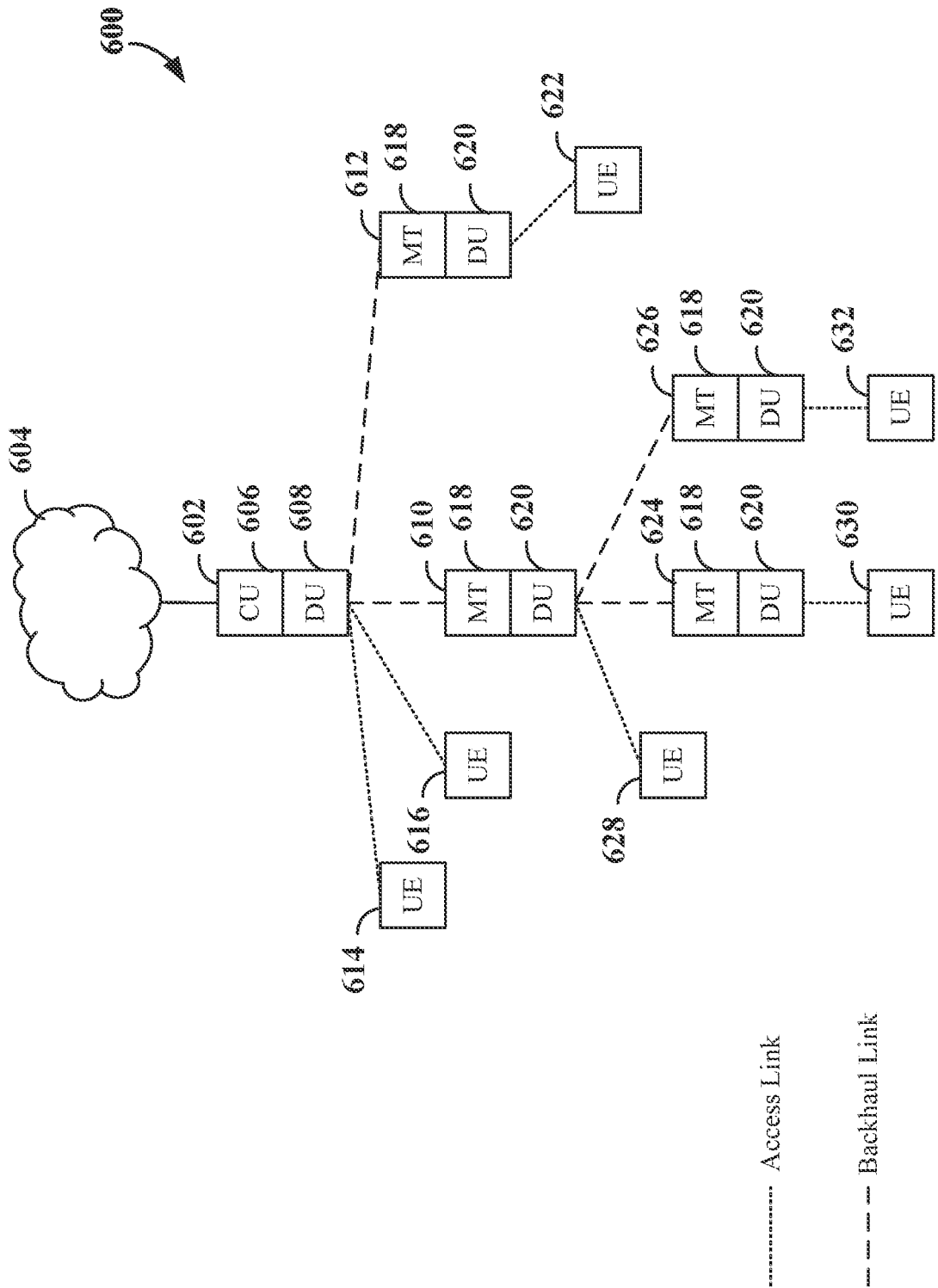
FIG. 6 is a diagram illustrating an example of IAB node functionality within an IAB network according to some aspects.

FIG. 6 is a schematic diagram illustrating an example of IAB node functionality within an IAB network 600. In the example shown in FIG. 6, an IAB node 602 is shown coupled to a core network 604 via a wireline connection. This JAB node 602 may be referred to herein as an IAB donor node, which may be, for example, an enhanced gNB including functionality for controlling the IAB network 600. In some examples, the IAB donor node 602 may include a central unit (CU) 606 and a distributed unit (DU) 608. The CU 606 is configured to operate as a centralized network node (or central entity) within the IAB network 600. For example, the CU 606 may include RRC layer functionality and PDCP layer functionality to control/configure the other nodes (e.g., IAB nodes and UEs) within the JAB network 600. Thus, the CU 606 can be configured to implement centralized mechanisms for handover decisions, topology changes, routing, bearer mapping, UE security, and other suitable services.

The DU 608 is configured to operate as a scheduling entity to schedule scheduled entities (e.g., other JAB nodes and UEs) of the IAB donor node 602. For example, the DU 608 of the IAB donor node 602 may operate as a scheduling entity to schedule IAB nodes 610 and 612 and UEs 614 and 616. Thus, the DU 608 of the IAB donor node 602 may schedule communication with IAB nodes 610 and 612 via respective backhaul links and schedule communication with UEs 614 and 616 via respective access links. In some examples, the DU 608 may include the RLC, MAC, and PHY layer functionality to enable operation as a scheduling entity.

Each of the JAB nodes 610 and 612 may be configured as a Layer 2 (L2) relay node including a respective DU 620 and a mobile termination (MT) unit 618 to enable each L2 relay IAB node 610 and 612 to operate as a scheduling entity and a scheduled entity. For example, the MT unit 618 within each of the L2 relay IAB nodes 610 and 612 is configured to operate as a scheduled entity that may be scheduled by the IAB donor node 602. Each MT unit 618 within the L2 relay IAB nodes 610 and 612 further facilitates communication with the IAB donor node 602 via respective backhaul links. In addition, the DU 620 within each of the L2 relay IAB nodes 610 and 612 operates similar to the DU 608 within the IAB donor node 602 to function as a scheduling entity to schedule one or more respective scheduled entities (e.g., other IAB nodes and/or UEs) of the L2 relay IAB nodes 610 and 612.

For example, the DU 620 of L2 relay IAB node 612 functions as a scheduling entity to schedule communication with a UE 622 via an access link, while the DU 620 of L2 relay IAB node 610 functions as a scheduling entity to schedule communication with the MT units 618 of L2 relay IAB nodes 624 and 626 via respective backhaul links and a UE 628 via an access link. Each of the L2 relay IAB nodes 624 and 626 further includes a respective DU 620 that functions as a scheduling entity to communicate with respective UEs 630 and 632.

Thus, in the network topology illustrated in FIG. 6, the IAB donor node 602, in combination with each of the L2 relay IAB nodes 610, 612, 624 and 626, can collectively form a disaggregated base station. The disaggregated base station includes the CU 606 and each of the DUs 608 and 620 controlled by the CU 606. The CU/DU functional split in disaggregated base stations can facilitate the realization of time-critical services, such as scheduling, retransmission, segmentation, and other similar services in the DU 608/620, while centralizing the less time-critical services in the CU 606. In addition, the CU/DU separation enables termination of external interfaces in the CU 606 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network.

Figure 7:
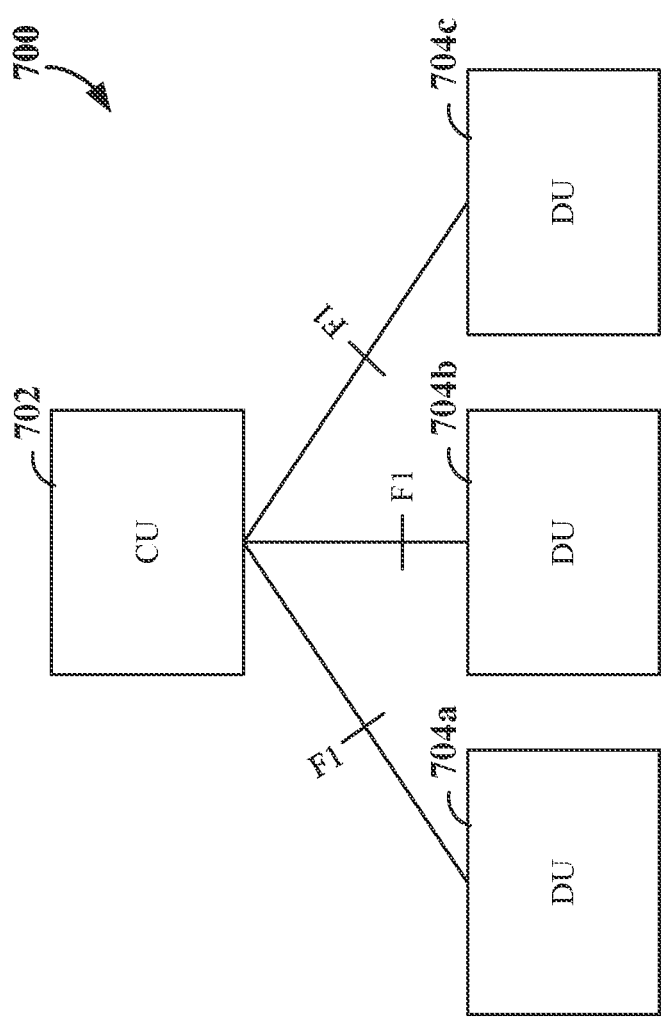
FIG. 7 is a diagram illustrating an example of a disaggregated base station according to some aspects.

FIG. 7 illustrates an example of a disaggregated base station 700 according to some aspects. The disaggregated base station 700 includes a CU 702 and one or more DUs (three of which, 704a, 704b, 704c, are shown for convenience). Each DU 704a, 704b, and 704c can support the PHY, MAC, and RLC layers of the radio protocol stack. The CU 702 supports the higher layers, such as the PDCP and RRC layers. One of the DUs (e.g., DU 704a) may be co-located with the CU 702, while the other DUs 704b and 704c may be distributed throughout a network. The CU 702 and DUs 704a, 704b, and 704c are logically connected via the F1 interface, which utilizes the F1 Application Protocol (F1-AP) for communication of information between the CU 702 and each of the DUs 704a, 704b, and 704c and for establishing generic tunneling protocol (GTP) tunnels between the DU and CU for each radio bearer.

In 5G NR systems, beamformed signals may be utilized for most downlink channels, including the PDCCH and PDSCH. In addition, broadcast control information, such as the SSB, slot format indicator (SFI), and paging information, may be transmitted in a beam-sweeping manner to enable all scheduled entities (e.g., UEs) in the coverage area of a base station to receive the broadcast control information. In some examples, a base station may have multiple TRPs for covering different directions, zones, cells, or tracking areas. In addition, for UEs configured with beamforming antenna arrays, beamformed signals may also be utilized for uplink channels, including the PUCCH and PUSCH. In addition, beamformed signals may further be utilized in D2D systems, such as NR sidelink (SL) or V2X.

Figure 8:
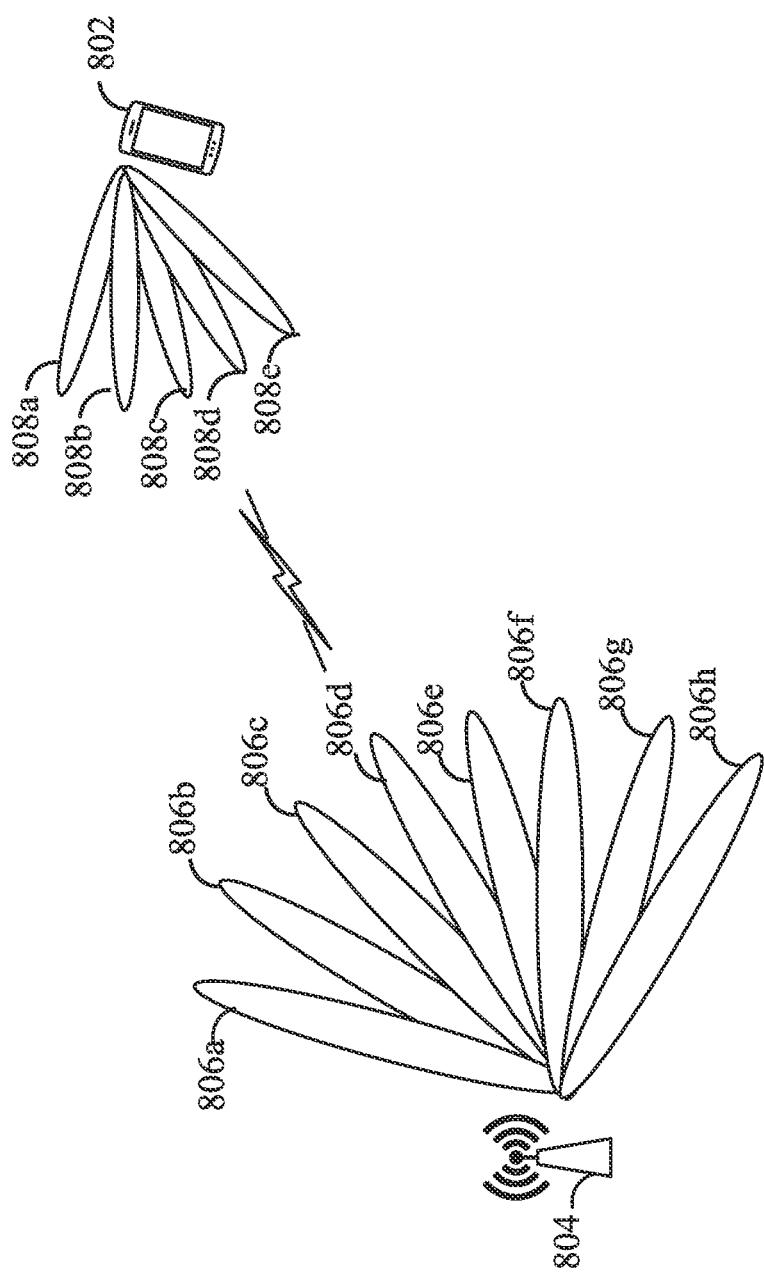
FIG. 8 is a diagram illustrating communication between a base station and a user equipment using beamformed signals according to some aspects.

FIG. 8 is a diagram illustrating communication between a base station 804 and a UE 802 using beamformed signals according to some aspects. The base station 804 may be any of the base stations (e.g., gNBs) or scheduling entities illustrated in FIGS. 1, 2, 3, 6, and/or 7, and the UE 802 may be any of the UEs or scheduled entities illustrated in FIGS. 1, 2, 3, and/or 6.

The base station 804 may generally be capable of communicating with the UE 802 using one or more transmit beams, and the UE 802 may further be capable of communicating with the base station 804 using one or more receive beams. As used herein, the term transmit beam refers to a beam on the base station 804 that may be utilized for downlink or uplink communication with the UE 802. In addition, the term receive beam refers to a beam on the UE 802 that may be utilized for downlink or uplink communication with the base station 804.

In the example shown in FIG. 8, the base station 804 is configured to generate a plurality of transmit beams 806a-806h, each associated with a different spatial direction. In addition, the UE 802 is configured to generate a plurality of receive beams 808a-808e, each associated with a different spatial direction. It should be noted that while some beams are illustrated as adjacent to one another, such an arrangement may be different in different aspects. For example, transmit beams 806a-806h transmitted during the same symbol may not be adjacent to one another. In some examples, the base station 804 and UE 802 may each transmit more or less beams distributed in all directions (e.g., 360 degrees) and in three dimensions. In addition, the transmit beams 806a-806h may include beams of varying beam width. For example, the base station 804 may transmit certain signals (e.g., SSBs) on wider beams and other signals (e.g., CSI-RSs, paging messages) on narrower beams.

The base station 804 and UE 802 may select one or more transmit beams 806a-806h on the base station 804 and one or more receive beams 808a-808e on the UE 802 for communication of uplink and downlink signals therebetween using a beam management procedure. In one example, during initial cell acquisition, the UE 802 may perform a P1 beam management procedure to scan the plurality of transmit beams 806a-806h on the plurality of receive beams 808a-808e to select a beam pair link (e.g., one of the transmit beams 806a-806h and one of the receive beams 808a-808e) for a physical random access channel (PRACH) procedure for initial access to the cell. For example, periodic SSB beam sweeping may be implemented on the base station 804 at certain intervals (e.g., based on the SSB periodicity). Thus, the base station 804 may be configured to sweep or transmit an SSB on each of a plurality of wider transmit beams 806a-806h during the beam sweeping interval. Each SSB can be transmitted/received with a certain beam, and an SSB can be identified by a corresponding SSB index. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 804 and UE 802 may perform a P2 beam management procedure for beam refinement at the base station 804. For example, the base station 804 may be configured to sweep or transmit a CSI-RS on each of a plurality of narrower transmit beams 806a-806h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 802 is configured to scan the plurality of CSI-RS transmit beams 806a-806h on the plurality of receive beams 808a-808e. The UE 802 then performs beam measurements (e.g., RSRP, SINR, etc.) of the received CSI-RSs on each of the receive beams 808a-808e to determine the respective beam quality of each of the CSI-RS transmit beams 806a-806h as measured on each of the receive beams 808a-808e.

The UE 802 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 806a-806h on one or more of the receive beams 808a-808e to the base station 804. The base station 804 may then select one or more CSI-RS transmit beams on which to communicate downlink and/or uplink control and/or data with the UE 802. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 802 may further select a corresponding receive beam on the UE 802 for each selected serving CSI-RS transmit beam to form a respective beam pair link (BPL) for each selected serving CSI-RS transmit beam. For example, the UE 802 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 804 may configure the UE 802 to perform SSB beam measurements and provide an L1 measurement report containing beam measurements of SSB transmit beams 806a-806h. For example, the base station 804 may configure the UE 802 to perform SSB beam measurements and/or CSI-RS beam measurements for beam failure detection (BRD), beam failure recovery (BFR), cell reselection, beam tracking (e.g., for a mobile UE 802 and/or base station 804), or other beam optimization purpose.

In addition, when the channel is reciprocal, the transmit and receive beams may be selected using an uplink beam management scheme. In an example, the UE 802 may be configured to sweep or transmit on each of a plurality of receive beams 808a-808e. For example, the UE 802 may transmit an SRS on each beam in the different beam directions. In addition, the base station 804 may be configured to receive the uplink beam reference signals on a plurality of transmit beams 806a-806h. The base station 804 then performs beam measurements (e.g., RSRP, SINR, etc.) of the beam reference signals on each of the transmit beams 806a-806h to determine the respective beam quality of each of the receive beams 808a-808e as measured on each of the transmit beams 806a-806h.

The base station 804 may then select one or more transmit beams on which to communicate downlink and/or uplink control and/or data with the UE 802. In some examples, the selected transmit beam(s) have the highest RSRP. The UE 802 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 806d) on the base station 804 and a single receive beam (e.g., beam 808c) on the UE may form a single BPL used for communication between the base station 804 and the UE 802. In another example, multiple CSI-RS transmit beams (e.g., beams 806c, 806d, and 806e) on the base station 804 and a single receive beam (e.g., beam 808c) on the UE 802 may form respective BPLs used for communication between the base station 804 and the UE 802. In another example, multiple CSI-RS transmit beams (e.g., beams 806c, 806d, and 806e) on the base station 804 and multiple receive beams (e.g., beams 808c and 808d) on the UE 802 may form multiple BPLs used for communication between the base station 804 and the UE 802. In this example, a first BPL may include transmit beam 806c and receive beam 808c, a second BPL may include transmit beam 808d and receive beam 808c, and a third BPL may include transmit beam 808e and receive beam 808d.

The functions of the RRC protocol include connection establishment and release functions, broadcast of system information, radio bearer establishment, reconfiguration and release, RRC connection mobility procedures, paging notification (e.g., paging initiated by 5GC or NG-RAN) and release and outer loop power control. A UE can be in different RRC modes including a connected mode, an idle mode, or an inactive mode. A UE may enter the idle mode or inactive mode that can provide power savings to the UE. In the idle mode, the UE does not have an RRC connection with the network. While the UE is in idle mode, a network may need to page the UE in order to establish a connection with the UE, e.g., when there is downlink traffic for the UE. In the inactive mode, the signaling connection between the base station and the AMF is maintained while the UE RRC connection is inactive, and an anchor base station (e.g., gNB) can maintain the context for the UE. However, while in the inactive mode, the UE is not actively communicating with the RAN. Thus, in inactive mode, when there is downlink traffic for the UE, the UE may need to be paged, similar to the idle mode. The network may use one of two paging modes, a core network (CN) paging mode or a RAN paging mode. CN paging mode and/or RAN paging mode may be employed, e.g., for NR based communication.

CN paging may be employed when a UE is in an idle mode and is not in communication with a cell. In CN paging, when the UE needs to be paged, the CN initiates the paging procedure. For example, the paging procedure may be initiated by an AMF (e.g., AMF 208). The AMF may send a paging request to at least one base station (e.g., base station 108) to send a paging message to the UE (e.g., UE 106/202). The paging request may be sent to a plurality of base stations (e.g., base stations 310 and 312) covering a tracking area (TA) where the UE is expected to be located. The paging message, if received by the UE, prompts the UE to establish a connection with one of the base stations. In some aspects, the TA may correspond to one or more TRPs.

In RAN paging, a UE may be RRC-connected yet operating in an inactive mode. Thus, the anchor base station (e.g., base station 312) may be responsible to maintain information (e.g., UE context) regarding the UE (e.g., UE 328). When the UE needs to be paged, the anchor RAN can initiate the paging process. The anchor RAN may be the RAN that last served the UE. When downlink traffic becomes available for the UE in the inactive mode, the downlink traffic is sent to the anchor base station. The anchor base station then initiates paging for the UE. The anchor base station may send a paging request to at least one other base station to send a paging message to the UE. The paging request may be sent to one or more base stations covering one or more tracking areas where the UE is expected to be located. The paging message prompts the UE to establish a connection with one of the base stations.

In both CN paging and RAN paging, the current location of the UE may not be known because the UE may have moved while in the idle mode or the inactive mode. Therefore, the network may page the UE in multiple locations (e.g., different cells) in order to deliver the paging message to the UE. In a 5G network, communication may be beamformed, as described in relation to FIG. 8. Thus, in addition to paging the UE in different locations, the UE can be paged in multiple directions, e.g., beam swept paging. In some cases, the network may repeat the paging message multiple times in order to reach the UE. Each repetition can be beam swept to provide the repetitions of the paging message in multiple directions. Thus, the repeated transmission of the paging message in multiple directions (e.g., on multiple beams) can result in a large overhead and place a substantial burden on a base station. In addition, when the paging message is sent to all directions or areas, there may be an undesirable amount of latency to re-establish the connection with the UE.

In some aspects of the disclosure, the overhead and latency in paging can be reduced by using beam-related paging assistance information in a paging procedure. The present disclosure provides a solution to the problems of high overhead and latency in paging a UE by using beam-related paging assistance information to page the UE in a smaller area or fewer directions.

Figure 9:
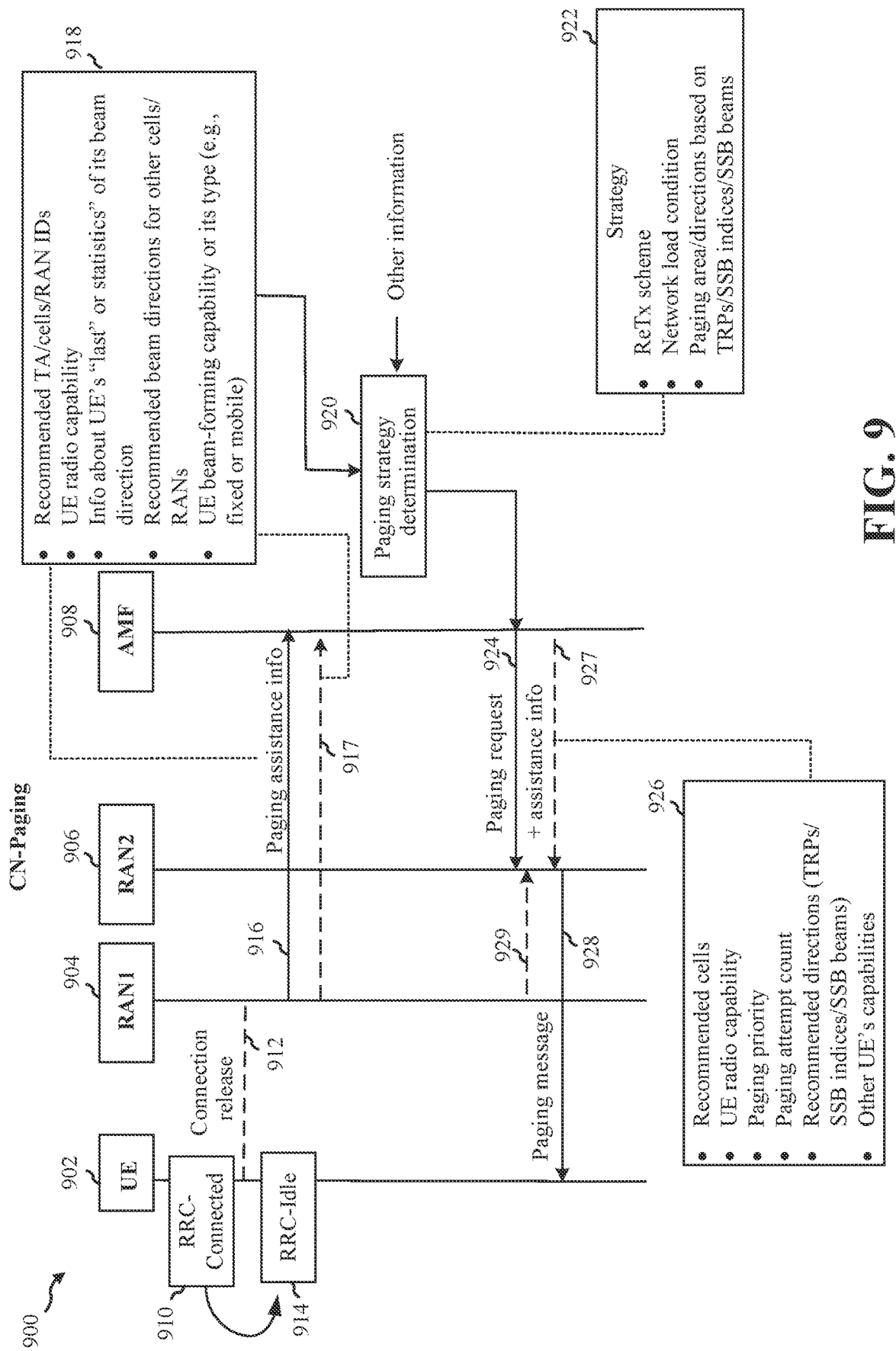
FIG. 9 is a schematic illustration of exemplary communication involving code network (CN) paging using beam-related assistance information according to some aspects.

FIG. 9 illustrates exemplary communication 900 involving CN paging using beam-related assistance information according to some aspects. A UE 902 may establish an RRC connection with a first RAN (e.g., RAN1 904). The first RAN may include a NG-RAN (e.g., NG-RAN 204 or RAN 300). At 910, the UE 902 may be in an RRC connected mode with the RAN1 904. The UE may determine to enter an RRC idle mode, e.g., when there is no ongoing communication with the network. At 912, the RRC connection between the UE 902 and RAN1 904 may be released, and the UE may enter an idle mode at 914. In the idle mode, the UE may enter a sleep mode and may periodically wake up to determine whether the UE has been paged by the network.

The RAN1 904 may send paging assistance information 916 to an AMF 908 along with the release of the RRC connection with the UE 902. In one example, the AMF 908 may be the AMF 252 of FIG. 2. Thus, the RAN1 may provide some paging assistance information to the network that may help paging the UE in the future. For example, the paging assistance information 918 may include any combination of recommended tracking area(s), recommended cell(s), or recommended RAN IDs. The paging assistance information 918 may also include UE radio capability information, such as a bandwidth supported by the UE. In some aspects, the RAN1 904 may provide beam-related information to the AMF 908 that may be used to page the UE. In one example, this beam-related information may be provided to the AMF along with the paging assistance information message 916 transmitted by the RAN1 904 after a connection release. In another example, the beam-related information may be provided in a separate message/indication 917 from the RAN1 904. The separate message 917 may be transmitted from the RAN1 904 to the AMF 908, e.g., while the UE is still in an RRC connected mode. In some aspects, the separate message 917 may be transmitted from the RAN1 904 to the AMF 908 upon a request from the AMF 908 to the RAN1 904.

In some aspects, the beam-related information may include information regarding beamforming direction(s) previously used in communication between the RAN1 904 and the UE 902. The AMF and other RANs may select a beam to begin paging the UE based on the previous beam direction(s) used by the RAN1 904 for the UE. In some aspects, the beam-related information may indicate one or more TRPs, SSB indices, and/or SSB beams (or SSB areas) that correspond to one or more locations (e.g., TA) and/or directions where the UE can be paged. For example, an initial paging message may be transmitted in a beam direction based on the last beam direction or a subset of beam directions surrounding the last beam direction. If a response is not received from the UE, then the paging message may be sent to the UE in additional beams or beam directions. If a base station that is transmitting the paging message is at a different location than the last base station used to communicate with the UE (e.g., before the UE entered RRC Idle state), the base station may use a beam that targets a similar location that would have been targeted by the last beam information for the last base station. For example, given a paging base station located directly eastward of the last base station along with beam-related information indicating that the last base station was transmitting eastward to communicate with the UE, the current paging base station may page the UE using a beam facing westward. Similar determinations of beamforming information may be performed based on relative locations of the paging base station to the last base station, direction of travel of the UE, known traveling routes, or the like.

The AMF 908 may use the paging assistance information 916 and beam-related information, to determine a paging strategy 920 for the UE. In some aspects, the paging strategy may also be based on other information received from other network entities, e.g., an indication of the importance or priority of the paging, etc., in addition to the paging assistance information 916, 918 and beam-related information. In some aspects, the paging strategy 922 may include any combination of a retransmission scheme, a determination of whether to transmit paging in high-load conditions, sub-area (e.g., an area covered by one or more TRPs, SSB indices, or SSB beams) based paging information, etc.

To page the UE 902, the AMF 908 can initiate a paging request 924 that is sent to a RAN, e.g., RAN2 906. The RAN2 906 may be an NG-RAN (e.g., NG-RAN 204 or RAN 300), for example. In addition to the paging request, or included with the paging request 924, the AMF may provide paging assistance information to the RAN2 906 for paging the UE 902. The paging assistance information 926 may include any combination of recommended cells for paging the UE, UE radio capability (e.g., a supported bandwidth), a paging priority, a paging attempt count, beam-related information (e.g., TRPs, SSB indices, and/or SSB beams), etc. The paging assistance information may be based, at least in part, on the paging strategy 922 determined at 920. The RAN2 906 then transmits a paging message 928 to the UE 902.

In some aspects, the beam-related information may be communicated as information elements between the RAN and AMF. The RAN may use the beam-related information to indicate a beam direction and/or location for paging the UE. For example, the RAN may provide information regarding the beam direction last used to communicate with the UE, a series of beam directions used to communicate with the UE over time, and/or a location determined based on a satellite navigation system or local wireless nodes (e.g., Wi-Fi or cellular nodes). In some aspects, the location/direction may be indicated by one or more TRPs, SSB indices, and/or SSB beams used to communicate with the UE before the UE entered the idle/inactive mode. The RAN may provide an analysis of the location/direction of the UE, e.g., by indicating a more likely direction or location in which the UE may move to or a prediction regarding the UE's trajectory. This information may be provided to the AMF or other RANs to enable more efficient paging of the UE.

In some aspects, the beam-related information may include statistics or history regarding beam directions used in communication between the RAN1 904 and the UE 902. This may enable a determination of a change in direction/location of the UE over time. The beam direction statistics/history may be used to predict a location of the UE and to select a beam direction strategy for paging the UE. For example, the beam-related information may include the statistics/history on the TRPs, SSB indices, and/or SSB beams used to communicate with the UE.

In one example, the RAN1 904 may provide a report of DL and/or UL beam measurements corresponding to the UE 902 as a part of the beam-related information. The beam measurements may be measurements performed by the RAN1 904 and/or reports of measurements performed by the UE 902. Thus, this information collected by the RAN1 904 may be provided to the core network (e.g., AMF 908) to assist with future paging of the UE. The RAN1 904 may provide the beam-related information in terms of an absolute angular direction, e.g., a quantized angular direction. Thus, an angular value for the UE, e.g., relative to the RAN1, may be indicated to the core network. The RAN1 may provide the beam-related information in terms of an absolute direction. Thus, the RAN1 may share information regarding the location/direction of the UE, while served by the RAN1, with the core network in connection with the paging assistance information for an idle UE. This location information may include information that is more detailed (e.g., TRPs, SSB indices, and/or SSB beams) than the mere presence of the UE within a cell or TA, and may include angle or direction information relative to the RAN1.

In one example, the RAN1 904 may provide raw beamforming information to the core network without indicating a particular location/direction for paging the UE. In another example, the RAN1 904 may perform an analysis or generate a summary based on the beamforming information measured by the RAN1 before sending processed or predicted beamforming information to the code network (e.g., AMF 908). In this case, the beam-related information provided by the RAN1 to the AMF may include information regarding an expected trajectory or location for a mobile UE.

In one example, the beam-related information may include a recommended beam direction for other cells and/or other RANs. The recommended beam direction may be specific to a particular RAN, e.g., associated with a RAN ID or RAN area code. For example, RAN1 904 may use reported beam measurements that the RAN1 904 received from the UE 902 regarding beam measurements of the neighboring cells to determine a more likely beam direction for paging the UE from the neighboring cells (e.g., base stations or TRPs). After determining a likely beam direction, the RAN1 904 may provide the beam information (e.g., TRPs, SSB indices, and/or SSB beams) to the AMF 908. In another example, the RAN1 904 may use inter-cell measurements, in place of or in addition to the UE beam measurements, to predict a more likely beam direction/area for paging the UE from the neighboring cells.

In another example, the beam-related information may include information regarding the UE beamforming capability. The RAN1 904 may provide beamforming capability information about the UE 902, e.g., such as a number and/or arrangement of the UE's antenna subarrays, a number and/or type of the transmission/reception beams of the UE, and/or omni beams or narrow beams supported by the UE. The beamforming information may also include an indication of a type of UE, e.g., indicating whether the UE is a fixed UE or a mobile UE, a relay UE, an access UE, etc.

As described above, the paging assistance information 918 received by the AMF 908 from the RAN1 904 may include beam-related information. The AMF 908 may use the beam-related information to select a RAN (e.g., RAN2 906) to which the AMF will send a paging request (e.g., paging request 924) for the UE. The beam-related information from the RAN1 904 may also be used by the AMF 908 to determine other aspects of a paging strategy. For example, the AMF 908 may use the beam-related information to determine the cells, directions, TRPs, SSB indices, and/or SSB beams within each RAN, where the paging message 928 is transmitted to the UE.

In some aspects, the AMF 908 may use the beam-related information to determine information to include in a paging request 924 and/or beamforming assistance information message to be sent to the RAN2 906 for paging the UE 902. Such information may be referred to herein as beam assistance information, as the information may assist the RAN in determining a beam or direction to use in paging the UE. The beam assistance information may include the same information as the beam-related information sent by the RAN1 904 to the AMF 908. Thus, the information may be referred to as beam information, beamforming information, beam assistance information, or beamforming assistance information. In other examples, the beamforming assistance information may include a portion of the beam-related information sent by the RAN1, a compilation of beam-related information sent to the AMF by multiple RANs, or information generated by the AMF based on the beam-related information sent to the AMF by RAN1. For example, the AMF may determine a recommended direction for paging the UE for each of one or more base stations in a tracking area (TA) and may provide the recommended direction (e.g., in terms of one or more TRPs, SSB indices, and/or SSB beams) to the RAN2. As another example, each base station (e.g., gNB) may determine its own recommended direction based on the beamforming information. The determination of a recommended direction, beam, or set of beams for initial paging by a base station may be performed at any level or within any entity within the RAN or core network without departing from the scope of the present disclosure.

In some aspects, the AMF 908 may explicitly provide beamforming assistance information (e.g., recommended beam direction for paging the UE 902) to the RAN2 906. In one example, the AMF may define a priority per beam or for a group of beam directions for the UE. The AMF may define a priority per angular direction or per location for the UE. Information regarding the defined priority may be provided to the RAN2 as beamforming assistance information for paging the UE.

In another example, the AMF may provide the recommended beam direction to the RAN2 in an implicit manner. For example, the AMF may indicate a last serving area (e.g., RAN or cell) to the RAN2. For example, the paging request 924 or a separate message 927 may include a last serving RAN ID or last serving cell ID. In some examples, the AMF may indicate the TRPs, SSB indices, and/or SSB beams in the last serving area (RAN or cell). Such beamforming assistance information may also include an indication of time corresponding to the last serving RAN/cell (e.g., time served by one or more TRPs/SSB indices/SSB beams). For example, time information or a time stamp may be included with the indication of the last serving RAN ID or the last serving cell ID. In another example, the core network may use the time information to determine what beamforming information to use in determining a paging strategy and/or to provide to the RAN2 without explicitly indicating the time information to the RAN2.

The RAN2 may use this beamforming assistance information to infer a recommended beam direction/area for paging the UE, for example, using one or more TRPs, SSB indices, and/ SSB beams. Therefore, rather than blindly sweeping all beam directions, the RAN2 can use the beamforming assistance information to determine a targeted or limited beam sweep direction or beam sweep pattern. For example, a direction that is more likely to successfully deliver the paging message to the UE may be determined based on the beamforming assistance information. Therefore, the beamforming assistance information may be used by the core network and/or the RAN2 to determine a paging strategy for paging the UE.

In some aspects, the beamforming assistance information sent to the RAN2 from the AMF may include beamforming capability information for the UE. Beamforming capability information for the UE may include, for example, any of a number and/or arrangement of the UE's antenna subarrays, a number and/or type of the transmission/reception beams of the UE, and/or whether the UE uses omni beams or narrow beams. The AMF may also indicate UE type information, e.g., whether the UE is a fixed UE, a mobile UE, a relay UE, or an access UE.

In one example, the AMF may forward the beam-related information (e.g., provided by the RAN1 to the AMF at 916 or 917) as the beamforming assistance information in 924/927. The AMF may forward all of the received beam-related information or may forward only a part of the beam-related information received from the RAN1.

In another example, the AMF may process the beam-related information received from the RAN1 to determine the beamforming assistance information to send to the RAN2 in connection with the paging request. For example, the AMF may receive reports and messages regarding beam information for the UE from multiple RANs. The AMF may determine the assistance information, e.g., the beamforming assistance information, to be sent in connection with a paging request for the UE based on the reports and messages from the multiple RANs.

In one example, the beamforming assistance information may be signaled from the AMF 908 to the RAN2 906 along with or included in the paging request 924. In another example, the beamforming assistance information may be signaled separately by the AMF to the RAN2 906, as illustrated at 927. The beamforming assistance information may be signaled to the RAN2 906 either before or after the paging request. In another example, the beamforming assistance information may be signaled to the RAN2 906 in response to a request from the RAN2. In yet another example, the beamforming assistance information, e.g., at 929, may be provided to the RAN2 906 directly from another RAN (e.g., RAN1 904). In one example, the last serving RAN (e.g., RAN1 904) for the UE may send beamforming assistance information for the UE to the RAN2 906 to which the paging request is sent. In another example, the RAN2 906 may receive the beamforming assistance information from a RAN other than the last serving RAN. In one example, the beamforming assistance information may be communicated from the RAN1 904 to the RAN2 906 through Xn signaling.

The RAN2 906 receiving the paging request 924 may use the beamforming assistance information to select a beam direction and/or area to transmit the paging signal to the UE, e.g., a beam direction or area having a higher priority or probability of finding the UE. For example, the RAN2 906 may transmit the paging signal in a first beam direction with a higher frequency. In another example, the RAN2 may determine to transmit the paging signal in a first beam direction initially and then in other beam directions after the transmission in the first beam direction. In one example, the RAN2 may transmit the paging signal in the other directions, if the UE does not respond to the paging signal transmitted in the first beam direction.

Figure 10:
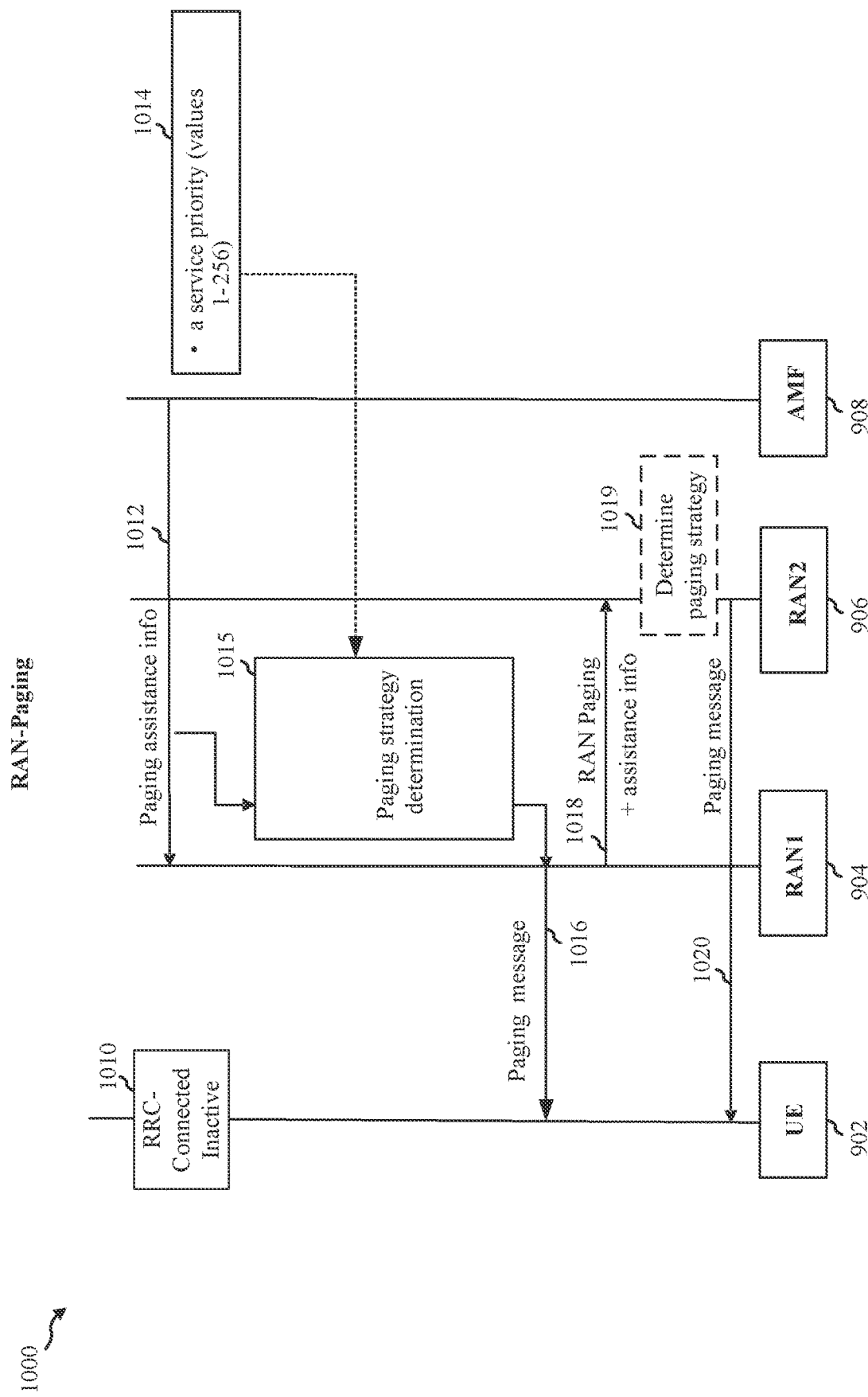
FIG. 10 is a schematic illustration of exemplary communication involving RAN paging using beam-related assistance information according to some aspects.

FIG. 10 illustrates an exemplary RAN paging process 1000 according to some aspects of the disclosure. Aspects similar to FIG. 9 have been labeled with the same reference numbers. In FIG. 10, when the UE 902 switches from a connected mode to an inactive mode at 1010, the RAN1 904 may become the anchor RAN for the UE. For example, the anchor RAN may be a last serving RAN for the UE before entering the inactive mode. When the UE is RRC connected, the RAN1 904 maintains the context of the UE. Thus, the RAN1 904 may initiate paging of the UE 902, e.g., when downlink traffic becomes available for the UE 902 in the inactive mode. To that end, the RAN1 904 may transmit a paging message 1016 to the UE 902.

The RAN1 904 may receive paging assistance information 1012 from the core network (e.g., AMF 908). The paging assistance information 1012 may include additional information that the core network has acquired regarding the UE, e.g., from other RANs. Such information 1012 may include beam-related information, for example, a report of beam measurements corresponding to the UE, as reported by other RANs. The information 1012 may also include information (e.g., statistics or mobility history) determined by the AMF regarding the UE's direction or trajectory, or potential location. In some aspects, the paging assistance information 1012 may indicate recommended cells, TRPs, SSB indices, and/or beam directions (e.g., SSB beams) for the RAN1 904. The RAN1 904 may use the paging assistance information 1012 provided by the AMF 908 and/or the beamforming information determined by RAN1 for the UE to determine a paging strategy 1015 for the UE. The paging strategy may also be based on other information received from the core network, such as a priority level 1014 regarding the DL traffic that triggered the paging of the UE. The RAN1 may send a paging message 1016 to the UE based on the determined paging strategy.

The RAN1 904 may also indicate to other RANs to send a paging message 1020 to the UE 902. For example, the RAN1 940 may instruct other RANs (e.g., at 1018 to RAN2) in the vicinity to page the UE, because the RAN1 904 may not be aware of the UE's location. For example, the RAN1 may provide beam-related paging assistance information, which may also be referred to as beamforming assistance information, to the RAN2 906. The beamforming assistance information may include similar beam-related information that the RAN1 provides to the AMF and/or the beamforming assistance information that the AMF provides to the RANs, as described above in the CN paging example of FIG. 9. In other examples, the beamforming assistance information provided by the RAN1 904 to the RAN2 906 may include different information than that the RAN1 would send to the AMF 908.

In some aspects, the recommended paging direction (e.g., beam direction, section, tracking area (e.g., in terms of TRPs, SSB indices, and/or SSB beams)) may be indicated indirectly. For example, rather than explicitly providing a beam direction/area for the RAN2 906, the RAN2 may have a prior knowledge of the relative location of RAN1 along with an ID (e.g., RAN area code) of RAN1 sending the paging request to select a more likely paging direction (e.g., beam direction) for the UE. The RAN2 may use the cell ID or a last beam direction used to communicate with the UE in order to infer a more likely direction for paging the UE. For example, the RAN1 may provide the RAN2 with a beam sweeping strategy, as determined at 1015, or the RAN2 may determine a beam sweeping strategy 1019 based on the beamforming information/beamforming assistance information received from the other sources (e.g., AMF or other RANs).

In another example, the RAN2 906 may receive the assistance information from a different RAN other than the RAN1 904. For example, the other RAN may be another RAN in the tracking area of the UE. The information may be provided by the RAN1 to the other RAN, which in turn provides the beamforming information/beamforming assistance information to the RAN2.

Figure 11:
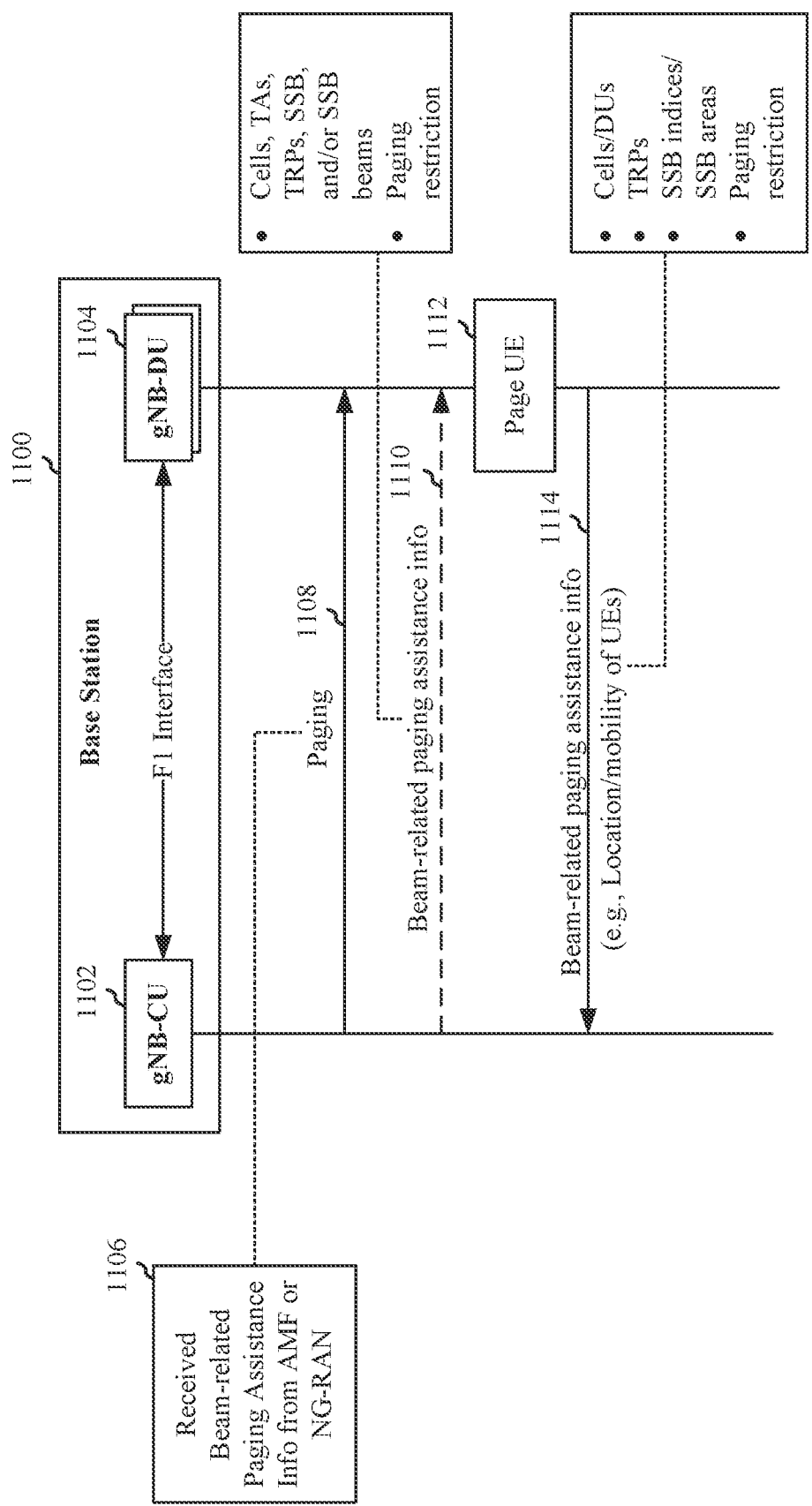
FIG. 11 is a schematic illustration of exemplary communication involving paging between a centralized unit (CU) and a distributed unit (DU) of a base station according to some aspects of the disclosure.

FIG. 11 is a diagram illustrating exemplary communication over an F1 interface between a centralized unit (CU) and a distributed unit (DU) of a base station 1100 to facilitate the exchange of beam-related paging assistance information according to some aspects. In some examples, the base station 1100 may be any of the base stations and gNBs of FIGS. 1, 3, 6, 7, 8, 9, and 10. In some aspects, the base station 1100 (e.g., a gNB in RAN1 904) may receive beam-related paging assistance information (BPAI) 1106 from an AMF or another RAN (e.g., RAN2 906) for paging a UE (e.g., UE 902). For example, the BPAI 1106 may be available to a CU 1102 of the base station 1100. The CU can use the BPAI 1106 to determine one or more DUs for paging the UE. Thus, the CU 1102 can provide the BPAI to one or more DUs 1104 of the base station via an F1 interface between the CU and the DU. In some aspects, the CU/DU(s) can use the BPAI to determine a paging direction or location of the UE based on, for example, one or more cells, TAs, TRPs, SSB indices, and/or SSB beams indicated by the BPAI.

In one aspect, the CU 1102 can transmit a paging message 1108 including the BPAI to one or more DUs (e.g., DU 1104). For example, the paging message 1108 can include a list of paging cells (e.g., using a "Paging Cell List" information element) and respective paging priority of the cells, among other parameters. In one aspect, the CU 1102 can provide the BPAI in a separate message (e.g., message 1110) before or after the paging message 1108. In some aspects, the BPAI may include a list of TRPs, SSB indices, and/or SSB beams that identify the potential direction(s) or location(s) (e.g., TA(s)) for paging the UE in one or more cells. In some aspects, a priority information may be associated with each item (e.g., TRP, SSB index, and SSB beam) to indicate the respective likelihood or probability that the UE can be successfully paged in various directions or locations based on the TRPs, SSB indices, and/or SSB beams indicated in the BPAI. For example, at 1112, the DU 1104 can page the UE using the TRPs, SSB indices, and/or SSB beams in an order or sequence based on the respective priority of each of the TRPs, SSB indices, and/or SSB beams, instead of paging the UE using all available cells or Tas, for example, at the same time. In one example, the CU/DU can start paging the UE using one or more TRPs, SSB indices, and/or SSB beams with the higher likelihood/probability according to the BPAI. Then, if paging is not successful, the CU/DU can use the other TRPs/SSB indices/SSB beams in turn with increasingly lower likelihood/probability for paging the UE until paging is successful or all TRPs/SSB indices/SSB beams are used for paging the UE.

In some aspects, the priority or likelihood information included in the BPAI (e.g., priority on TRPs/SSB indices/SSB beams) may be implied, for example, using a sorted list of the TRPs, SSB indices, and/or SSB beams. For example, the first item in the list (e.g., a first TRP/SSB index/SSB beam) can have the highest priority (or likelihood), the next item has a lower priority than the first item and so on, and the last item of the list has the lowest priority among all the items.

In some aspects, the CU 1102 may provide the DU 1104 with paging restriction information in the BPAI. The restriction information may indicate a direction and/or a location where paging is restricted or avoided. For example, the paging restriction information may include a blacklist of one or more cells, TAs, TRPs, SSB indices, and/or SSB beams. Thus, the DU 1104 can avoid paging the UE in the directions or locations (e.g., beam directions/areas) indicated by the paging restriction information. For example, the CU may determine that the UE is likely not in some areas/directions, and/or sending paging messages in those areas/directions may cause issues such as interference to other cells. In that case, the CU/DU can avoid paging in that direction/location based on the paging restriction information.

In some cases, the DU 1104 may have local information (i.e., information not known to the CU 1102) about the UE served by the DU. For example, the DU may have information on the location and/or mobility of the UE with respect to other cells. In some aspects, the DU 1104 may provide the local information in beam-related paging assistance information 1114 to the CU 1102. Then, the CU can later use the DU provided local information about the UE to determine where to page the UE. In some aspects, the beam-related paging assistance information 1114 may include similar information as the BPAI 1110 available to the CU 1102. In one example, the beam-related paging assistance information 1114 may include a list of cells, DUs, and/or TRPs the UE used recently. The paging assistance information 1114 may further include the SSB indices/SSB beams associated with the list of cells/DU/TRPs. The list may explicitly provide a priority value associated with each item or implicitly for example in a sorted list. In some examples, the beam-related paging assistance information 1114 may include paging restriction information, for example, a blacklist of cells, TAs, TRPs, SSB indices, and/or SSB beams.

In some aspects, the CU 1102 (e.g., in RAN1 904) can provide a list of TRPs (associated with another RAN, e.g., RAN2 906) as part of the paging assistance information to the AMF 908 and/or RAN2 906. Thus, the AMF 908 can also provide a list of TRPs (e.g., in a TRP ID information element) as part of the paging assistance information to the RAN2 906 (e.g., a base station in RAN2), along with the paging request 924.

In some examples, the paging assistance information (e.g., paging assistance information 916 or 1106) may include a list of recommended cells (e.g., in a Recommended Cell List information element) and/or a list of recommended TRPs. In one example, if the paging assistance information provides a list of recommended cells without TRP ID information, the AMF/RAN2 can page the UE on the recommended cells and all the TRPs associated with the cells. In one example, if the paging assistance information provides a list of recommended TRPs without recommended cell information, the AMF/RAN2 can page the UE on the recommended TRPs in all the associated cells. In one example, if the paging assistance information provides both a list of recommended TRPs and a list of recommended cells, the AMF/RAN2 can page the UE on the recommended cell and associated TRP pairs.

In some aspects, the paging assistance information exchanged between the AMF, RAN (e.g., RAN1 904 and RAN2 906), and UE can include mobility history that can indicate the time the UE (e.g., UE 902) spent in a cell or TRP(s). In some aspects, the time-related information or mobility history may indicate the time the UE stayed in location(s) or area(s) corresponding to one or more TRPs, SSB indices, and/or SSB beams. In some aspects, this time-related information or mobility history can be exchanged between two RANs (e.g., between CUs located in different RANs).

Figure 12:
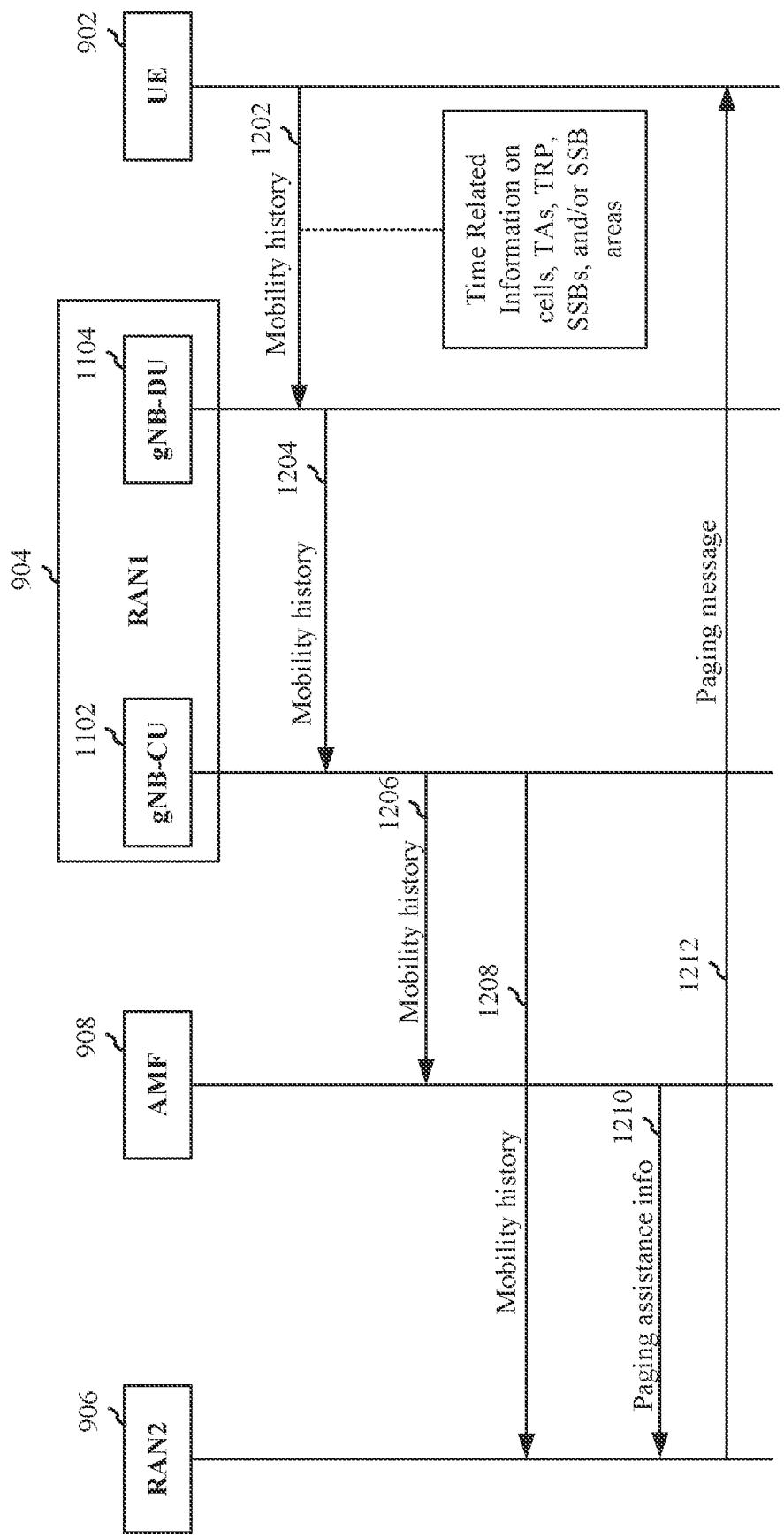
FIG. 12 is a schematic illustration of exemplary communication of mobility history information exchanges between RANs, a UE, and a core network according to some aspects.

FIG. 12 is a diagram illustrating exemplary mobility history information exchanges between RANs, a UE, and a core network according to some aspects. The mobility history information can facilitate UE paging using beam-related paging assistance information described above. In one example, the UE (e.g., UE 902) can provide a mobility history report 1202 to a first RAN (e.g., RAN 1 904). In some aspects, the mobility history report 1202 can provide time-related mobility information or history about the UE. For example, the mobility history report 1202 can include a list of visited cells, TAs, TRPs, SSB indices, and/or SSB beams (associated with one or more cells) along with the time stayed in each cell, TA, TRP, SSB index, and/or SSB beam. In some cases, the information about the TRP may not be available at the UE. For example, the availability of TRP information may depend on the RRC state of the UE (e.g., available in RRC connected mode, not available in the idle state/inactive state).

At a base station in the RAN1 904, for example, the CU 1102 can receive the mobility history report 1204 with the above-described time-related information from the DU 1104. In one aspect, RAN1 904 (e.g., CU 1102) can provide the mobility history 1206 to an AMF (e.g., AMF 908). In one aspect, the RAN1 904 (e.g., CU 1102) can provide the mobility history received from the UE 902 to another RAN (e.g., RAN2 906). For example, the mobility history report 1208 can include information about the cells, TAs, TRPs, SSB indices, and/or SSB beams (and associated cells) visited by the UE 902 along with the time stayed information in each cell, TA, TRP, SSB index, and/or SSB beam. In one aspect, the core network (e.g., AMF 908) can provide paging assistance information 1210 to another RAN (e.g., RAN2 906) based on the time-related mobility history information. Thus, the RAN2 906 can page 1212 the UE 902 based on the paging assistance information 1210 and mobility history.

Figure 13:
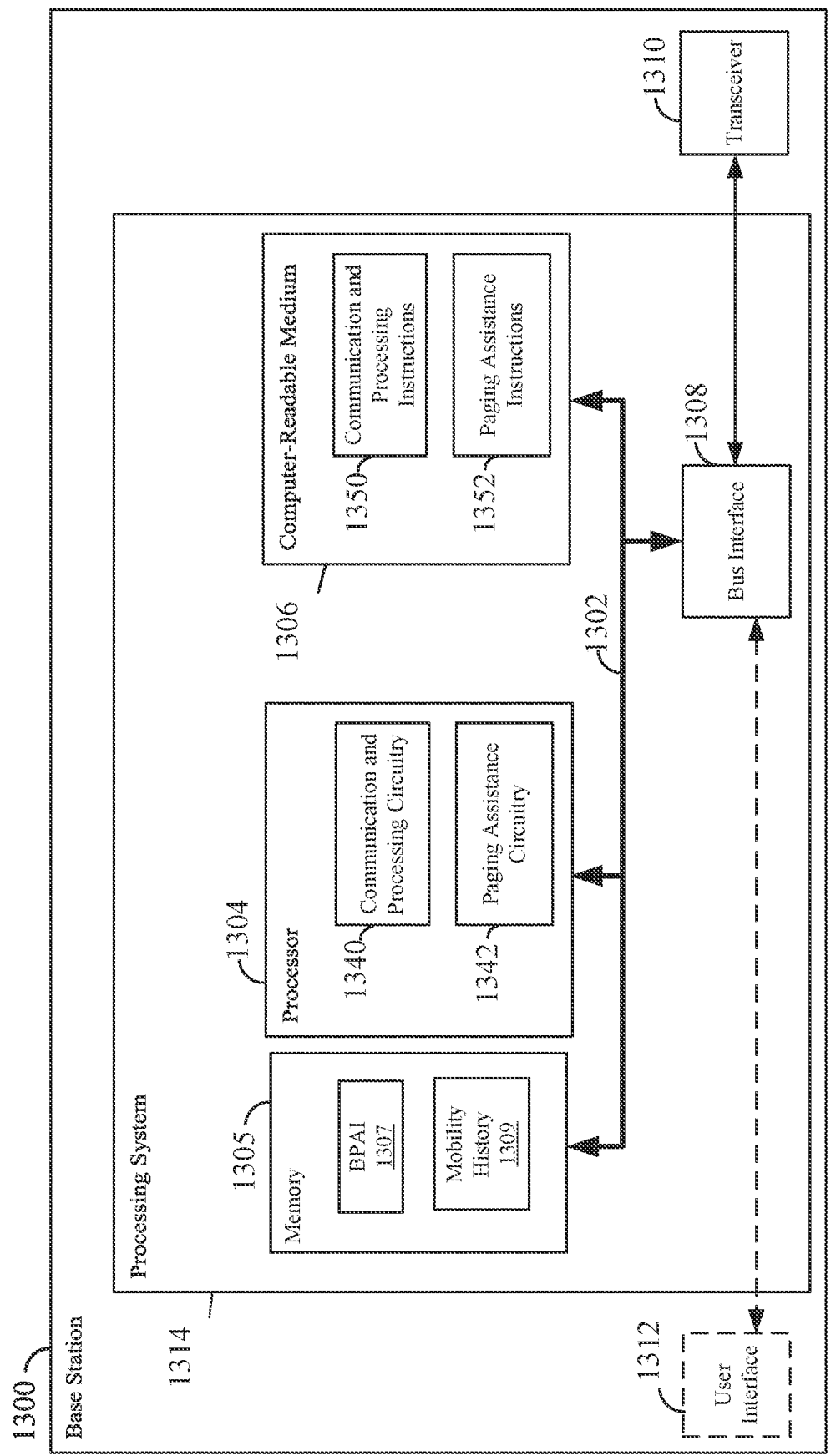
FIG. 13 is a block diagram conceptually illustrating an example of a hardware implementation for a base station according to some aspects.

FIG. 13 is a block diagram illustrating an example of a hardware implementation for a wireless communication apparatus 1300 employing a processing system 1314. In one example, the apparatus 1300 may be a base station (e.g., a gNB or scheduling entity) as illustrated in any one or more of FIGS. 1, 3, 5, 6, 7, 8, 9, 10, 11, and/or 12. In some aspects, the apparatus 1300 may implement the functions of a CU and/or DU of a base station. In some examples, multiple wireless apparatuses 1300 can be used to implement a CU and one or more associated DUs.

The apparatus 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in the apparatus 1300, may be used to implement any one or more of the processes and procedures described and illustrated, for example, in FIGS. 9-12, 14, and 15.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatuses (e.g., AMF, base stations, UEs) over a transmission medium. For example, the transceiver 1310 may provide the communication interface with a RAN node (e.g., a gNB or base station), AMF, depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include circuitry configured for various functions, including, for example, CU functions and/or DU functions used for paging operations. For example, the circuitry may be configured to implement one or more of the functions described below in relation to FIGS. 14 and 15.

In some aspects of the disclosure, the processor 1304 may include communication and processing circuitry 1340 configured for various functions, including for example communicating with a network core (e.g., a 5G core network, AMF), scheduled entities (e.g., UE), or any other entity, such as, for example, another RAN node (e.g., a base station or gNB). In some examples, the communication and processing circuitry 1340 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1340 may include one or more transmit/receive chains. In addition, the communication and processing circuitry 1340 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1340 may further be configured to execute communication and processing software 1350 stored on the computer-readable medium 1306 to implement one or more functions described herein.

In some implementations where the communication involves receiving information, the communication and processing circuitry 1340 may obtain information from a component of the wireless apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1340 may output the information to another component of the processor 1304, to the memory 1305, or to the bus interface 1308. In some examples, the communication and processing circuitry 1340 may receive one or more of signals, messages, other information, or any combination thereof. In some examples, the communication and processing circuitry 1340 may receive information via one or more channels. In some examples, the communication and processing circuitry 1340 may include functionality for a means for receiving. In some examples, the communication and processing circuitry 1340 may include functionality for a means for processing, including a means for demodulating, a means for decoding, etc.

In some implementations where the communication involves sending (e.g., transmitting) information, the communication and processing circuitry 1340 may obtain information (e.g., from another component of the processor 1304, the memory 1305, or the bus interface 1308), process (e.g., modulate, encode, etc.) the information, and output the processed information. For example, the communication and processing circuitry 1340 may output the information to the transceiver 1310 (e.g., that transmits the information via radio frequency signaling or some other type of signaling suitable for the applicable communication medium). In some examples, the communication and processing circuitry 1340 may send one or more of signals, messages, other information, or any combination thereof. In some examples, the communication and processing circuitry 1340 may send information via one or more channels. In some examples, the communication and processing circuitry 1340 may include functionality for a means for sending (e.g., a means for transmitting). In some examples, the communication and processing circuitry 1340 may include functionality for a means for generating, including a means for modulating, a means for encoding, etc.

The processor 1304 is responsible for managing the bus 1302 and general processing, including the execution of software stored on the computer-readable medium 1306. The software, when executed by the processor 1304, causes the processing system 1314 to perform the various functions described herein for any particular apparatus. The computer-readable medium 1306 and the memory 1305 may also be used for storing data that is manipulated by the processor 1304 when executing software. For example, the processor 1304 may store paging assistance information (e.g., BPAI 1307 and mobility history 1309) of one or more UEs in the memory 1305.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include a paging assistance circuitry 1342 configured for various functions, including for example, paging functions using beam-related paging assistance functions as described in relation to FIGS. 9-12, 14, and 15. In one aspect, the paging assistance circuitry 1342 can be configured to provide a DU with beam-related paging assistance information for paging a UE. In one aspect, the paging assistance circuitry 1342 can provide a CU with beam-related paging assistance information for paging a UE. For example, the paging assistance information may include local information about the location and/or mobility history of a UE with respect or other cells or TRPs. In one aspect, the paging assistance circuitry 1342 can provide another RAN or an AMF with beam-related paging assistance information for paging a UE. In one aspect, the paging assistance circuitry 1342 can receive beam-related paging assistance information for paging a UE from an AMF or another RAN. The paging assistance circuitry 1342 may further be configured to execute paging assistance software 1352 stored on the computer-readable medium 1306 to implement one or more functions described herein.

Figure 14:
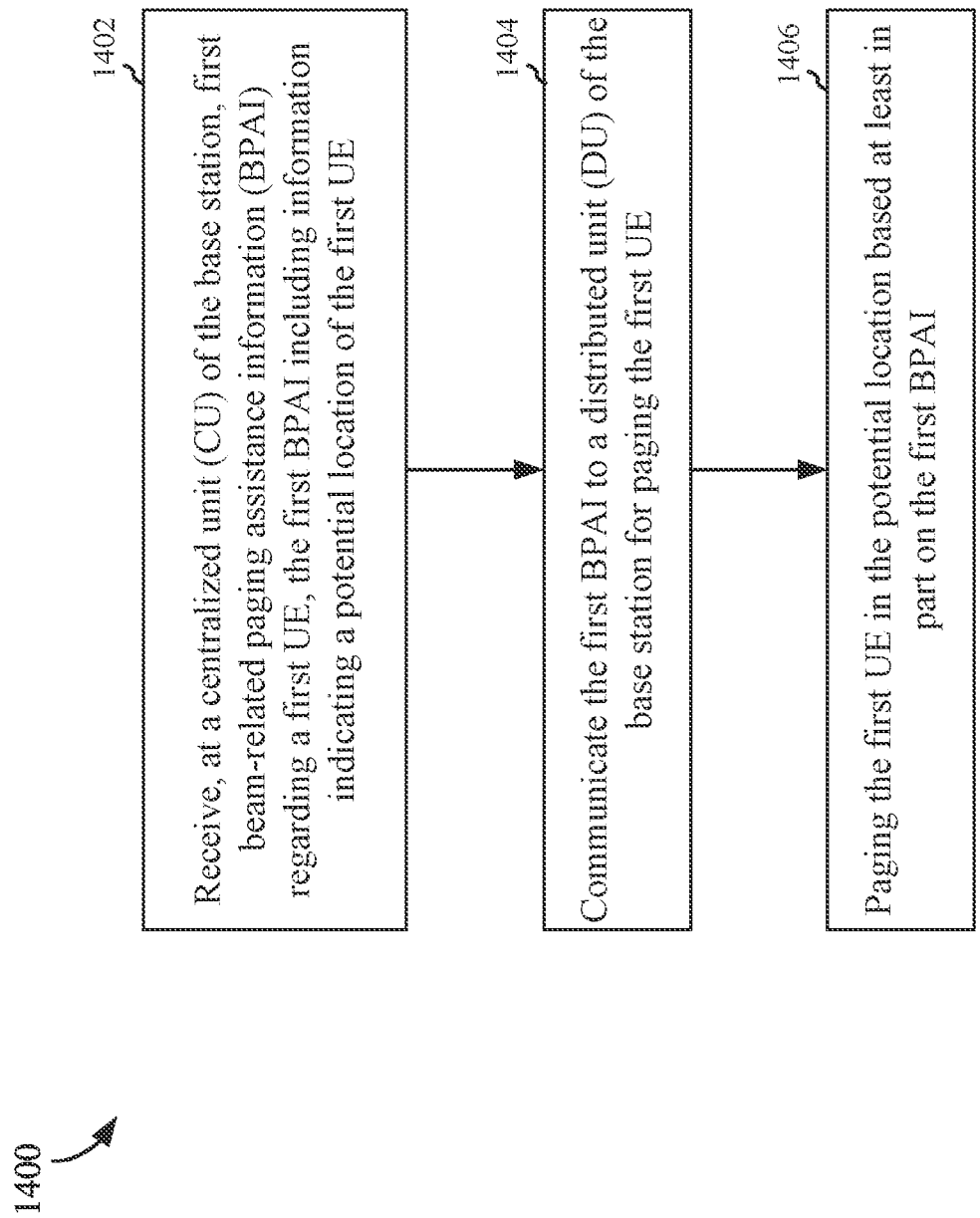
FIG. 14 is a flow chart illustrating an exemplary process at a CU for paging using beam-related paging assistance information according to some aspects.

FIG. 14 is a flow chart illustrating an exemplary process 1400 for wireless communication in accordance with some aspects. As described below, some or all illustrated features may be omitted in a particular implementation within the scope of the present disclosure, and some illustrated features may not be required for all implementations. In some examples, the process 1400 may be carried out by the wireless communication apparatus 1300 illustrated in FIG. 13. In some examples, the process 1400 may be carried out by any suitable apparatus or means for carrying out the functions or algorithm described below. In one example, the process 1400 may be performed by a base station in a first RAN (e.g., RAN 1 904).

At block 1402, a base station can receive first beam-related paging assistance information (BPAI) regarding a first UE (e.g., UE 902) (e.g., a UE served by a first RAN). For example, the CU 1102 of the base station can receive the first BPAI. The first BPAI can include information indicating a potential location or direction of the first UE. In one aspect, the communication and processing circuitry 1340 and transceiver 1310 can provide a means to receive the first BPAI from an AMF or another RAN. In one example, the first BPAI may indicate one or more TRPs, one or more SSB indices, and/or one or more SSB beams corresponding to the potential location/direction of the first UE. For example, the first BPAI can indicate a potential location of the first UE by indicating an area and/or direction covered to the one or more TRPs, one or more SSB indices, and/or one or more SSB beams. In some aspects, the first BPAI can further include at least one of a tracking area or a RAN area code (RANAC) that is defined in terms of the one or more TRPs, the one or more SSB indices, or the one or more SSB beams.

At block 1404, the base station (e.g., CU 1102) can communicate the first BPAI to a DU (e.g., DU 1104) of the base station. In one aspect, the communication and processing circuitry 1340 can provide a means to communicate the first BPAI to the DU. In some examples, the CU of the base station can use the transceiver 1310 to transmit the first BPAI to the DU if the DU is separately located from the CU. In some examples, the communication between the CU and DU is via an F1 interface. In some examples, the CU and the DU may be implemented using different apparatuses (e.g., multiple apparatuses 1300).

At block 1406, the base station can page the first UE in the potential location based at least in part on the first BPAI. In one aspect, the communication and processing circuitry 1340 and transceiver 1310 can provide a means to transmit a paging message 1108 for paging the first UE. For example, the CU of the base station can transmit a paging message 1108 to the DU including beam-related paging assistance information based at least in part on the first BPAI and/or paging assistance information received from other sources (e.g., AMF and/or other RANs). The paging message 1108 causes the DU to page the UE in the potential location. In one aspect, the paging assistance circuitry 1342 can provide a means to determine a paging location and/or direction for paging the UE based at least in part on the first BPAI. For example, the first BPAI can indicate one or more cells, TAs, TRPs, SSB indices, and SSB beams corresponding to the potential location of the first UE.

In some aspects, the BPAI can indicate at least one of a tracking area (TA) or a RAN area code (RANAC) that can be defined in terms of the one or more TRPs, the one or more SSB indices, or the one or more SSB beams. In some aspects, the BPAI can include priority information associated with at least one of the one or more TRPs, the one or more SSB indices, or the one or more SSB beams. The priority information can indicate a priority order of using the cells, TAs, TRPs, SSB indices, or SSB beams for paging the UE. In some aspects, the priority order of the TAs, TRPs, SSB indices, and/or SSB beams can be based on an order of the TAs, TRPs, SSB indices, and/or SSB beams listed in the BPAI.

In some aspects, the BPAI can include restriction information that excludes at least one of one or more cells, TAs, TRPs, SSB indices, and/or SSB beams for paging the UE. In some aspects, the base station can send the BPAI to an AMF or a second RAN (e.g., a second base station). In some aspects, the base station can receive the BPAI from an AMF. In one aspect, the base station can receive a mobility history from the UE. The mobility history can indicate a time the UE spent in a location corresponding to at least one of the cells, TAs, TRPs, SSB indices, and/or SSB beams included in the BPAI. The base station can send the mobility history to an AMF or a second RAN.

Figure 15:
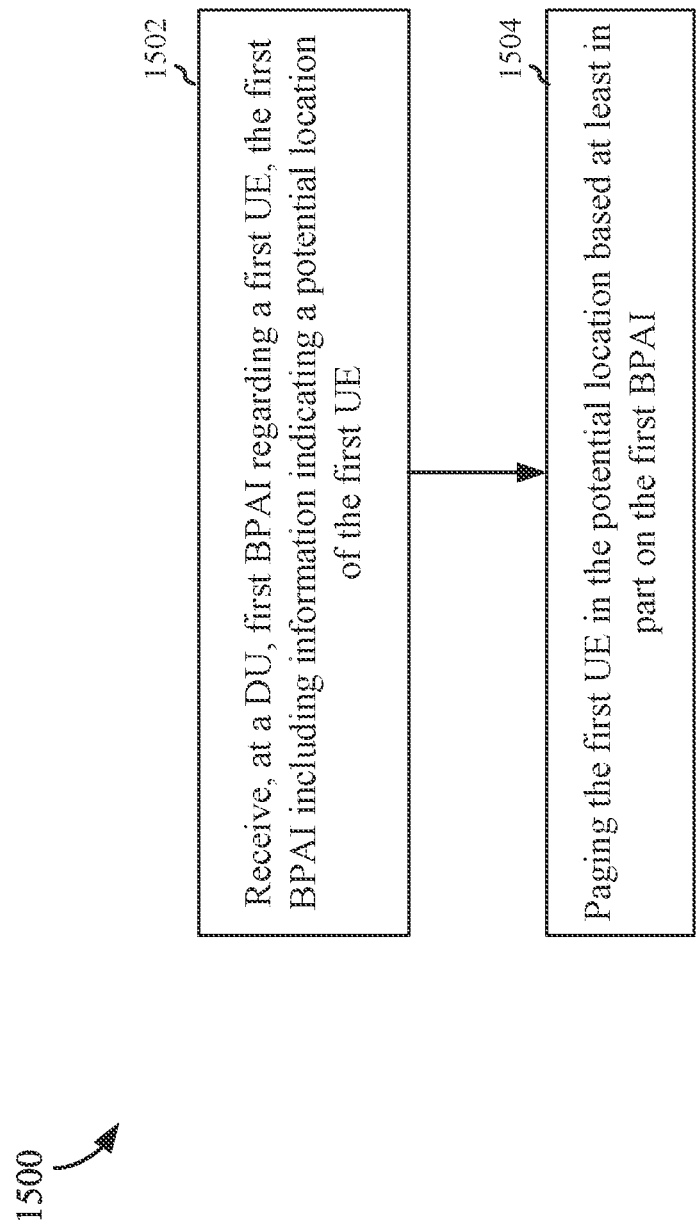
FIG. 15 is a flow chart illustrating an exemplary process at a DU for paging using beam-related paging assistance information according to some aspects.

FIG. 15 is a flow chart illustrating an exemplary process 1500 for wireless communication in accordance with some aspects. As described below, some or all illustrated features may be omitted in a particular implementation within the scope of the present disclosure, and some illustrated features may not be required for all implementations. In some examples, the process 1500 may be carried out by the wireless communication apparatus 1300 illustrated in FIG. 13. In some examples, the process 1500 may be carried out by any suitable apparatus or means for carrying out the functions or algorithm described below. In one example, the process 1500 may be performed by a base station in a first RAN (e.g., RAN 1 904).

At block 1502, a DU (e.g., DU 1104) can receive first BPAI (e.g., BPAI 1110) regarding a first UE. The first BPAI can include information indicating a potential location of the first UE. For example, the first BPAI may include a list of TRPs, SSB indices, and/or SSB beams that identify the potential direction(s) or location(s) (e.g., TA(s)) for paging the first UE in one or more cells. In one aspect, the communication and processing circuitry 1340 can provide a means to receive the first BPAI, for example, from a CU 1102 via an F1 interface. The DU may store the first BPAI (e.g., BPAI 1307) in the memory 1305.

At block 1504, the DU can page the first UE in the potential location based at least in part on the first BPAI. In one aspect, the paging assistance circuitry 1342 can provide a means for providing a paging message 1112 to page the first UE. For example, the DU can page the UE using the TRPs, SSB indices, and/or SSB beams (e.g., from the first BPAI) in an order or sequence based on the respective priority of each of the TRPs, SSB indices, and/or SSB beams, instead of paging the UE using all available cells or TAs, for example, at the same time. The communication and processing circuitry 1340 can provide a means to transmit the paging message to the first UE. In some cases, the DU may have local information (i.e., information not known to the CU) about the UE served by the DU In one aspect, the DU may provide the local information in second BPAI (e.g., BPAI 1114) to the CU. The second BPAI may include a list of cells, DUs, and/or TRPs the UE used recently. The second BPAI may further include the SSB indices/SSB beams associated with the list of cells/DU/TRPs. The second BPAI may further include paging restriction information, for example, a blacklist of cells, TAs, TRPs, SSB indices, and/or SSB beams.

In one configuration, the apparatus 1300 includes means for performing the paging operations described in relation to FIGS. 9-12, 14, and 15 using beam-related paging assistance information. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3, and 7-12, and utilizing, for example, the processes and/or algorithms described herein in relation to FIGS. 9-12, 14, and 15.

Figure 16:
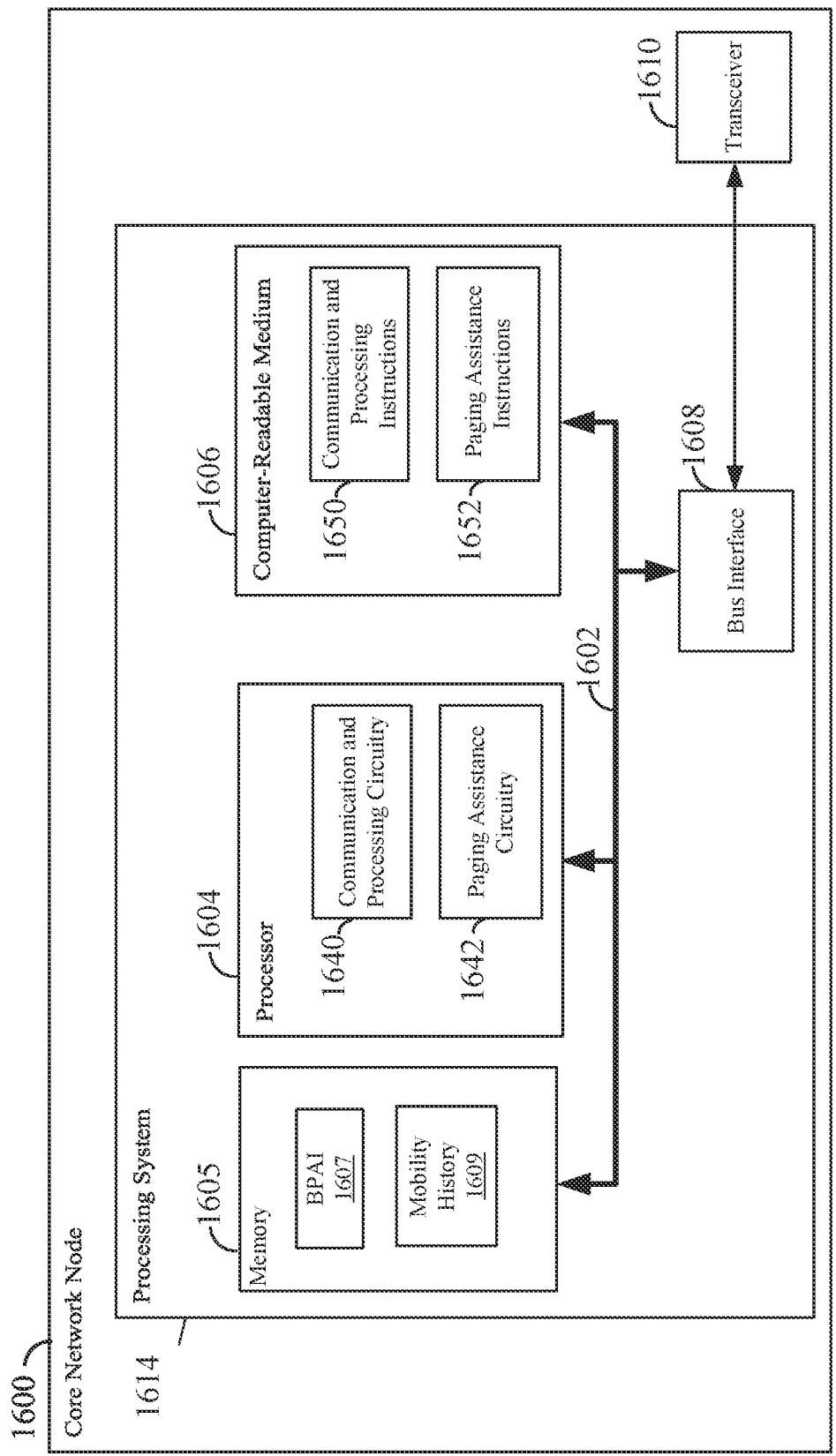
FIG. 16 is a block diagram conceptually illustrating an example of a hardware implementation for a core network node according to some aspects of the disclosure.

FIG. 16 is a conceptual diagram illustrating an example of a hardware implementation for an exemplary core network node 1600 employing a processing system 1614. In accordance with various aspects of the disclosure, an element, or any portion of an element, or any combination of elements may be implemented with a processing system 1614 that includes one or more processors 1604. For example, the core network node 1600 may be an AMF as illustrated in any one or more of FIGS. 2, 9, 10, and/or 12.

The AMF 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the AMF 1600 may be configured to perform any one or more of the functions described herein. That is, the processor 1604, as utilized in the AMF 1600, may be used to implement any one or more of the processes and procedures described and illustrated, for example, in FIGS. 9-12 and 17.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a communication interface or means for communicating with various other apparatuses over a transmission medium. For example, the transceiver 1610 may provide the communication interface for an AMF, depending upon the nature of the apparatus.

In some aspects of the disclosure, the processor 1604 may include circuitry configured for various functions, including, for example, functions used for UE paging operations in coordination with one or more RANs. For example, the circuitry may be configured to implement one or more of the functions described in relation to FIGS. 9-12 and 17.

In some aspects of the disclosure, the processor 1604 may include communication and processing circuitry 1640 configured for various functions, including for example communicating with a RAN node (e.g., a base station or gNB). In some examples, the communication and processing circuitry 1640 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1640 may include one or more transmit/receive chains. In addition, the communication and processing circuitry 1640 may be configured to receive/transmit and process messages to/from a RAN (e.g., a base station or gNB). The communication and processing circuitry 1640 may further be configured to execute communication and processing software 1650 stored on the computer-readable medium 1606 to implement one or more functions described herein.

In some implementations where the communication involves receiving information, the communication and processing circuitry 1640 may obtain information from a component of the apparatus 1600 (e.g., from the transceiver 1610 that receives the information via radio frequency signaling or some other type of signaling suitable for the applicable communication medium), process (e.g., decode) the information, and output the processed information. For example, the communication and processing circuitry 1640 may output the information to another component of the processor 1604, to the memory 1605, or to the bus interface 1608. In some examples, the communication and processing circuitry 1640 may receive one or more of signals, messages, other information, or any combination thereof. In some examples, the communication and processing circuitry 1640 may receive information via one or more channels. In some examples, the communication and processing circuitry 1640 may include functionality for a means for receiving. In some examples, the communication and processing circuitry 1640 may include functionality for a means for processing, including a means for demodulating, a means for decoding, etc.

In some implementations where the communication involves sending (e.g., transmitting) information, the communication and processing circuitry 1640 may obtain information (e.g., from another component of the processor 1604, the memory 1605, or the bus interface 1608), process (e.g., modulate, encode, etc.) the information, and output the processed information. For example, the communication and processing circuitry 1640 may output the information to the transceiver 1610 (e.g., that transmits the information via radio frequency signaling or some other type of signaling suitable for the applicable communication medium). In some examples, the communication and processing circuitry 1640 may send one or more of signals, messages, other information, or any combination thereof. In some examples, the communication and processing circuitry 1640 may send information via one or more channels. In some examples, the communication and processing circuitry 1640 may include functionality for a means for sending (e.g., a means for transmitting). In some examples, the communication and processing circuitry 1640 may include functionality for a means for generating, including a means for modulating, a means for encoding, etc.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, the processor 1604 may store paging-related information (e.g., BPAI 1607 and mobility history information 1609) of one or more UEs in the memory 1605.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include a paging assistance circuitry 1642 configured for various functions, including for example, UE paging using beam-related paging assistance functions as described in relation to FIGS. 9-12 and 17. In one aspect, the paging assistance circuitry 1642 can be configured to provide a RAN (e.g., a base station or gNB) with beam-related paging assistance information for paging a UE. In one aspect, the paging assistance circuitry 1642 can receive beam-related paging assistance information for paging a UE from a RAN. In one example, the paging assistance information may include local information about the location and/or mobility history of a UE with respect or other cells or TRPs. In one aspect, the paging assistance circuitry 1642 can determine paging assistance information based on BPAI received from multiple RANs. The paging assistance circuitry 1642 may further be configured to execute paging assistance software 1652 stored on the computer-readable medium 1606 to implement one or more functions described herein.

Figure 17:
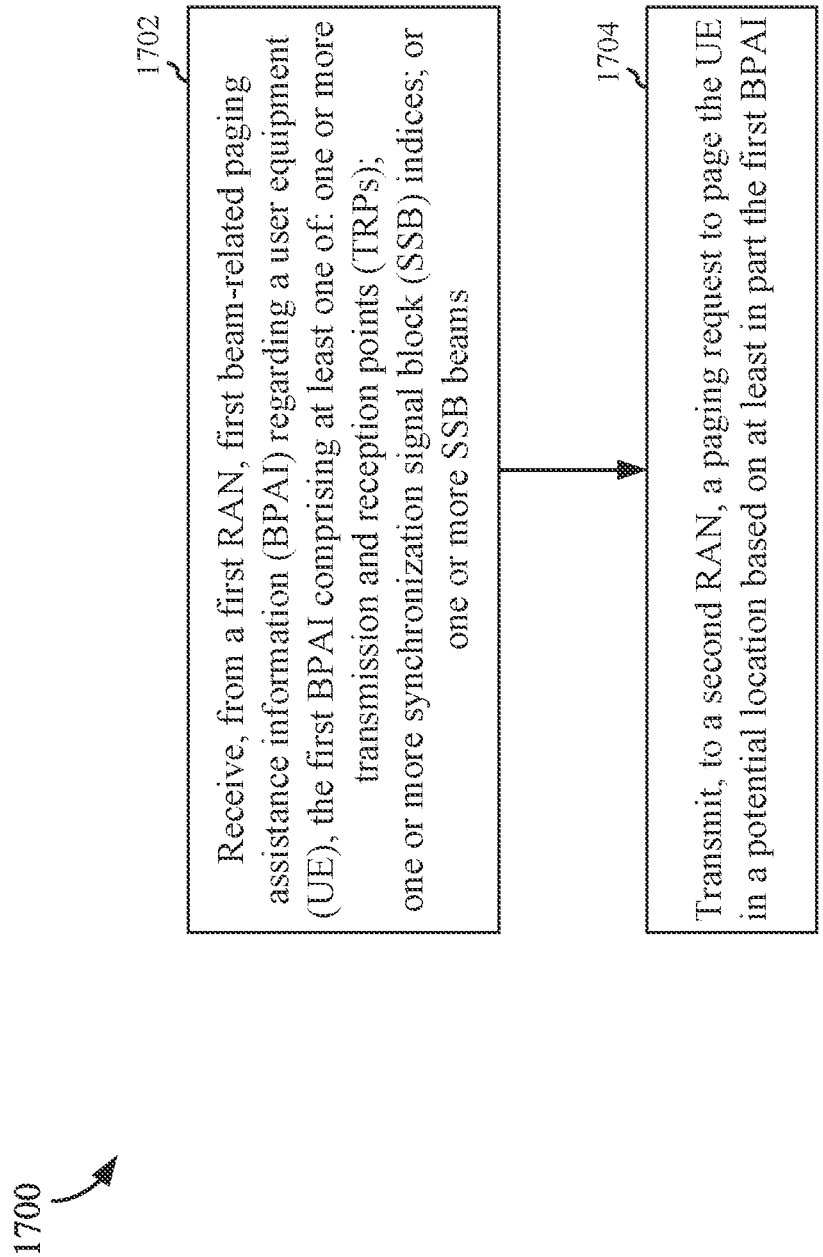
FIG. 17 is a flow chart illustrating an exemplary process at a core network node for paging using beam-related paging assistance information according to some aspects.

FIG. 17 is a flow chart illustrating an exemplary process 1700 for paging a UE in accordance with some aspects. As described below, some or all illustrated features may be omitted in a particular implementation within the scope of the present disclosure, and some illustrated features may not be required for all implementations. In some examples, the process 1700 may be carried out by a core network node (e.g., AMF implemented as the apparatus 1600 illustrated in FIG. 16). In some examples, the process 1700 may be carried out by any suitable apparatus or means for carrying out the functions or algorithm described below.

At block 1702, an AMF can receive, from a first RAN, first beam-related paging assistance information (BPAI) regarding a UE. In one aspect, the first BPAI can indicate at least one of: one or more TRPs; one or more SSB indices; or one or more SSB beams. The BPAI can indicate a potential location/direction for paging the UE based on the TRPs, SSB indices, and/or SSB beams. In one aspect, the communication and processing circuitry 1640 can provide a means to receive the first BPAI via the transceiver 1610 from a base station (e.g., a gNB of the first RAN). The AMF can store the first BPAI in a memory 1605 for used in paging operations.

At block 1704, the AMF can transmit, to a second RAN, a paging request to page the UE in a potential location based at least in part on the first BPAI. In one aspect, the communication and processing circuitry 1640 can provide a means to transmit the paging request. Each TRP, SSB index, and SSB beam can correspond to a certain location and/or direction for paging the UE. The AMF may determine the location and/or direction for paging the UE, for example, based on the TRPs, SSB indices, and/or SSB beams. The AMF can receive beam-related paging assistance information from multiple RANs (e.g., RAN1 904 and RAN2 906), and the AMF can combine the paging assistance information to determine one or more potential locations/directions for paging the UE. In one aspect, the paging assistance circuitry 1642 may provide a means to prepare the paging request based on the BPAI. For example, the paging assistance circuitry 1642 can provide a means to determine the paging location and/or direction based on the first BPAI.

The AMF can provide a second BPAI to the second RAN. The second BPAI is configured to indicate the potential location/direction at least in part based on the first BPAI. In one example, the AMF can include the second BPAI in the paging request or as a separate message. In one aspect, the AMF can receive mobility history information from the first RAN. The mobility history information can indicate a time the UE spent in at least one of: the one or more TRPs; the one or more SSB indices; or the one or more SSB beams. The AMF can determine the second BPAI based on the mobility history of the UE. The AMF and/or RAN may use mobility history to determine the potential location and/or direction for paging the UE. For example, if a UE spent more time in a location or direction associated with a certain TRP/SSB index/SSB beam, it is more likely that the UE can receive a page message sent by using that TRP/SSB index/SSB beam.

In one configuration, the apparatus 1600 can include means for the paging operations described in relation to FIG. 17 using beam-related paging assistance information. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described herein and utilizing, for example, the processes and/or algorithms described herein in relation to FIG. 17.

In a first aspect, . . .

In a second aspect, alone or in combination with the first aspect, . . .

In a first aspect, the disclosure provides a base station associated with a first radio access network (RAN) for wireless communication, comprising: a transceiver; a memory; and a processor coupled to the transceiver and the memory, wherein the processor and the memory are configured to: receive first beam-related paging assistance information (BPAI) regarding a first user equipment (UE), the first BPAI comprising information indicating a potential location of the first UE; communicate the first BPAI to a distributed unit (DU) of the base station for paging the first UE; and page the first UE in the potential location based at least in part on the first BPAI.

In a second aspect, alone or in combination with the first aspect, wherein the first BPAI comprises at least one of: one or more transmission and reception points (TRPs); one or more synchronization signal block (SSB) indices; or one or more SSB beams.

In a third aspect, alone or in combination with the second aspect, wherein the first BPAI further comprises at least one of a tracking area or a RAN area code that is defined in terms of the one or more TRPs, the one or more SSB indices, or the one or more SSB beams.

In a fourth aspect, alone or in combination with any of the second to third aspects, wherein the first BPAI further comprises priority information associated with at least one of the one or more TRPs, the one or more SSB indices, or the one or more SSB beams, the priority information indicating a probability of the first UE being located in an area corresponding to the respective TRPs, SSB indices, or SSB beams.

In a fifth aspect, alone or in combination with any of the second to third aspects, wherein a priority order of at least one of the one or more TRPs, the one or more SSB indices, or the one or more SSB beams is based on an order of at least one of the one or more TRPs, the one or more SSB indices, or the one or more SSB beams in the first BPAI.

In a sixth aspect, alone or in combination with any of the second to third aspects, wherein the first BPAI further comprises restriction information excluding at least one of the one or more TRPs, the one or more SSB indices, or the one or more SSB beams for paging the first UE.

In a seventh aspect, alone or in combination with any of the first to third aspects, wherein the processor and the memory are further configured to: receive, from the DU, second BPAI of a second UE associated with the current DU or a different DU for indicating a potential location of the second UE, the second BPAI comprising at least one of: one or more cells; one or more transmission and reception points (TRPs); one or more SSB indices; or one or more SSB beams.

In an eighth aspect, alone or in combination with the seventh aspect, wherein the second BPAI is configured to indicate a respective priority of at least one of the one or more cells, the one or more TRPs, the one or more SSB indices, or the one or more SSB beams for paging the second UE.

In a ninth aspect, alone or in combination with the seventh aspect, wherein the second BPAI further comprises restriction information excluding at least one of the one or more cells, the one or more TRPs, the one or more SSB indices, or the one or more SSB beams for paging the second UE.

In a tenth aspect, alone or in combination with any of the first to third aspects, wherein the processor and the memory are further configured to: send the first BPAI to at least one of an access and mobility management function (AMF) or a second RAN, the first BPAI comprising at least one of a list of transmission and reception points (TRPs) or a list of cells for paging the first UE.

In an eleventh aspect, alone or in combination with any of the first to third aspects, wherein the processor and the memory are further configured to: receive the first BPAI from an access and mobility management function (AMF) or a second RAN, the first BPAI comprising at least one of a list of transmission and reception points (TRPs) or a list of cells for paging the first UE.

In a twelfth aspect, alone or in combination with any of the first to third aspects, wherein the processor and the memory are further configured to: receive mobility history information from the first UE, the mobility history information indicating a time the first UE spent using at least one of: one or more transmission and reception points (TRPs); one or more synchronization signal block (SSB) indices; or one or more SSB beams; and send the mobility history information to an access and mobility management function (AMF) or a second RAN for paging the UE.

In a thirteenth aspect, the disclosure provides a method of wireless communication at a base station associated with a first radio access network (RAN), comprising: receiving first beam-related paging assistance information (BPAI) regarding a first user equipment (UE), the first BPAI comprising information indicating a potential location of the first UE; communicating the first BPAI to a distributed unit (DU) of the base station for paging the first UE; and paging the first UE in the potential location based at least in part on the first BPAI.

In a fourteenth aspect, alone or in combination with the thirteenth aspect, wherein the first BPAI comprises at least one of: one or more transmission and reception points (TRPs); one or more synchronization signal block (SSB) indices; or one or more SSB beams.

In a fifteenth aspect, alone or in combination with the fourteenth aspect, wherein the first BPAI further comprises at least one of a tracking area or a RAN area code that is defined in terms of the one or more TRPs, the one or more SSB indices, or the one or more SSB beams.

In a sixteenth aspect, alone or in combination with any of the fourteenth and fifteenth aspects, wherein the first BPAI further comprises priority information associated with at least one of the one or more TRPs, the one or more SSB indices, or the one or more SSB beams, the priority information indicating a probability of the first UE being located in an area corresponding to the respective TRPs, SSB indices, or SSB beams.

In a seventh aspect, alone or in combination with any of the fourteenth and fifteenth aspects, wherein a priority order of at least one of the one or more TRPs, the one or more SSB indices, or the one or more SSB beams is based on an order of at least one of the one or more TRPs, the one or more SSB indices, or the one or more SSB beams in the first BPAI.

In an eighteenth aspect, alone or in combination with any of the fourteenth and fifteenth aspects, wherein the first BPAI further comprises restriction information excluding at least one of the one or more TRPs, the one or more SSB indices, or the one or more SSB beams for paging the first UE.

In a nineteenth aspect, alone or in combination with any of the thirteenth to fifteenth aspects, the method further comprises: receiving, from the DU, second BPAI of a second UE associated with the current DU or a different DU for indicating a potential location of the second UE, the second BPAI comprising at least one of: one or more cells; one or more transmission and reception points (TRPs); one or more SSB indices; or one or more SSB beams.

In a twentieth aspect, alone or in combination with the nineteenth aspect, wherein the second BPAI is configured to indicate a respective priority of at least one of the one or more cells, the one or more TRPs, the one or more SSB indices, or the one or more SSB beams for paging the second UE.

In a twenty-first aspect, alone or in combination with the nineteenth aspect, wherein the second BPAI further comprises restriction information excluding at least one of the one or more cells, the one or more TRPs, the one or more SSB indices, or the one or more SSB beams for paging the second UE.

In a twenty-second aspect, alone or in combination with any of the thirteenth to fifteenth aspects, the method further comprises: sending the first BPAI to at least one of an access and mobility management function (AMF) or a second RAN, the first BPAI comprising at least one of a list of transmission and reception points (TRPs) or a list of cells for paging the first UE.

In a twenty-third aspect, alone or in combination with any of the thirteenth to fifteenth aspects, the method further comprises: receiving the first BPAI from an access and mobility management function (AMF) or a second RAN, the first BPAI comprising at least one of a list of transmission and reception points (TRPs) or a list of cells for paging the first UE.

In a twenty-fourth aspect, alone or in combination with any of the thirteenth to fifteenth aspects, the method further comprises: receiving mobility history information from the first UE, the mobility history information indicating a time the first UE spent using at least one of: one or more transmission and reception points (TRPs); one or more synchronization signal block (SSB) indices; or one or more SSB beams; and send the mobility history information to an access and mobility management function (AMF) or a second RAN for paging the UE.

In a twenty-fifth aspect, the disclosure provides a core network node for wireless communication, comprising: a memory; and a processor coupled to the memory, wherein the processor and the memory are configured to: receive, from a first radio access network (RAN), first beam-related paging assistance information (BPAI) regarding a user equipment (UE), the first BPAI comprising at least one of: one or more transmission and reception points (TRPs); one or more synchronization signal block (SSB) indices; or one or more SSB beams; and transmit, to a second RAN, a paging request to page the UE in a potential location based at least in part on the first BPAI.

In a twenty-sixth aspect, alone or in combination with the twenty-fifth aspect, wherein the processor and the memory are further configured to: determine a paging strategy based at least in part on the first BPAI; and provide a second BPAI to the second RAN, the second BPAI configured to indicate the potential location based on the paging strategy.

In a twenty-seventh aspect, alone or in combination with any of the twenty-fifth and twenty-sixth aspects, wherein the processor and the memory are further configured to: receive mobility history information from the first RAN, the mobility history information indicating a time the UE spent in at least one of: the one or more TRPs; the one or more SSB indices; or the one or more SSB beams; and determine the second BPAI based on the mobility history.

In a twenty-eighth aspect, the disclosure provides a method of wireless communication at a core network node, comprising: receiving, from a first radio access network (RAN), first beam-related paging assistance information (BPAI) regarding a user equipment (UE), the first BPAI comprising at least one of: one or more transmission and reception points (TRPs); one or more synchronization signal block (SSB) indices; or one or more SSB beams; and transmitting, to a second RAN, a paging request to page the UE in a potential location based at least in part on the first BPAI.

In a twenty-ninth aspect, alone or in combination with the twenty-eighth aspect, the method further comprises: determining a paging strategy based at least in part on the first BPAI; and providing a second BPAI to the second RAN, the second BPAI configured to indicate the potential location based on the paging strategy.

In a thirtieth aspect, alone or in combination with any of the twenty-eighth and twenty-ninth aspects, the method further comprises: receiving mobility history information from the first RAN, the mobility history information indicating a time the UE spent in at least one of: the one or more TRPs; the one or more SSB indices; or the one or more SSB beams; and determining the second BPAI based on the mobility history.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A base station associated with a first radio access network (RAN) for wireless communication, comprising:
   one or more memories; and
   one or more processors coupled to the one or more memories, the one or more processors being configured to:

receive, at a centralized unit (CU) of the base station, first beam-related paging assistance information (BPAI) regarding a first user equipment (UE), the first BPAI comprising information indicating at least one of one or more first transmission and reception points (TRPs), one or more first synchronization signal block (SSB) indices, or one or more first SSB beams corresponding to a potential location of the first UE;

communicate, from the CU of the base station, the first BPAI to a distributed unit (DU) of the base station for paging the first UE; and page, from the DU of the base station, the first UE in the potential location based at least in part on the first BPAI.

2. The base station of claim 1, wherein the first BPAI further comprises at least one of a tracking area or a RAN area code that is defined in terms of the one or more first TRPs, the one or more first SSB indices, or the one or more first SSB beams.

3. The base station of claim 1, wherein the first BPAI further comprises priority information associated with at least one of the one or more first TRPs, the one or more first SSB indices, or the one or more first SSB beams, the priority information indicating a probability of the first UE being located in an area corresponding to the respective first TRPs, first SSB indices, or first SSB beams.

4. The base station of claim 1, wherein a priority order of at least one of the one or more first TRPs, the one or more first SSB indices, or the one or more first SSB beams is based on an order of at least one of the one or more first TRPs, the one or more first SSB indices, or the one or more first SSB beams in the first BPAI.

5. The base station of claim 1, wherein the first BPAI further comprises restriction information excluding at least one of the one or more first TRPs, the one or more first SSB indices, or the one or more first SSB beams for paging the first UE.

6. The base station of claim 1, wherein the one or more processors are further configured to:

receive, from the DU, second BPAI of a second UE associated with the current DU or a different DU for indicating a potential location of the second UE, the second BPAI comprising at least one of:
one or more cells;
one or more second transmission and reception points (TRPs);
one or more second SSB indices; or
one or more second SSB beams.

7. The base station of claim 6, wherein the second BPAI is configured to indicate a respective priority of at least one of the one or more cells, the one or more second TRPs, the one or more second SSB indices, or the one or more second SSB beams for paging the second UE.

8. The base station of claim 6, wherein the second BPAI further comprises restriction information excluding at least one of the one or more cells, the one or more second TRPs, the one or more second SSB indices, or the one or more second SSB beams for paging the second UE.

9. The base station of claim 1, wherein the one or more processors are further configured to:

send the first BPAI to at least one of an access and mobility management function (AMF) or a second RAN, the first BPAI comprising at least one of the one or more first TRPs or a list of cells for paging the first UE.

10. The base station of claim 1, wherein the one or more processors are further configured to:

receive the first BPAI from an access and mobility management function (AMF) or a second RAN, the first BPAI comprising at least one of the one or more first TRPs or a list of cells for paging the first UE.

11. The base station of claim 1, wherein the one or more processors are further configured to:

receive mobility history information from the first UE, the mobility history information indicating a time the first UE spent using at least one of:
the one or more first TRPs;
the one or more first SSB indices; or
the one or more first SSB beams; and
send the mobility history information to an access and mobility management function (AMF) or a second RAN for paging the UE.

12. A method of wireless communication at a base station associated with a first radio access network (RAN), comprising:

receiving, at a centralized unit (CU) of the base station, first beam-related paging assistance information (BPAI) regarding a first user equipment (UE), the first BPAI comprising information indicating at least one of one or more first transmission and reception points (TRPs), one or more first synchronization signal block (SSB) indices, or one or more first SSB beams corresponding to a potential location of the first UE;

communicating, from the CU of the base station, the first BPAI to a distributed unit (DU) of the base station for paging the first UE; and paging, from the DU of the base station, the first UE in the potential location based at least in part on the first BPAI.

13. The method of claim 12, wherein the first BPAI further comprises at least one of a tracking area or a RAN area code that is defined in terms of the one or more first TRPs, the one or more first SSB indices, or the one or more first SSB beams.

14. The method of claim 12, wherein the first BPAI further comprises priority information associated with at least one of the one or more first TRPs, the one or more first SSB indices, or the one or more first SSB beams, the priority information indicating a probability of the first UE being located in an area corresponding to the respective first TRPs, first SSB indices, or first SSB beams.

15. The method of claim 12, wherein a priority order of at least one of the one or more first TRPs, the one or more first SSB indices, or the one or more first SSB beams is based on an order of at least one of the one or more first TRPs, the one or more first SSB indices, or the one or more first SSB beams in the first BPAI.

16. The method of claim 12, wherein the first BPAI further comprises restriction information excluding at least one of the one or more first TRPs, the one or more first SSB indices, or the one or more first SSB beams for paging the first UE.

17. The method of claim 12, further comprising:

receiving, from the DU, second BPAI of a second UE associated with the current DU or a different DU for indicating a potential location of the second UE, the second BPAI comprising at least one of:
one or more cells;
one or more second transmission and reception points (TRPs);
one or more second SSB indices; or
one or more second SSB beams.

18. The method of claim 17, wherein the second BPAI is configured to indicate a respective priority of at least one of the one or more cells, the one or more second TRPs, the one or more second SSB indices, or the one or more second SSB beams for paging the second UE.

19. The method of claim 17, wherein the second BPAI further comprises restriction information excluding at least one of the one or more cells, the one or more second TRPs, the one or more second SSB indices, or the one or more second SSB beams for paging the second UE.

20. The method of claim 12, further comprising:
sending the first BPAI to at least one of an access and mobility management function (AMF) or a second RAN, the first BPAI comprising at least one of the one or more first TRPs or a list of cells for paging the first UE.

21. The method of claim 12, further comprising:
receiving the first BPAI from an access and mobility management function (AMF) or a second RAN, the first BPAI comprising at least one of the one or more first TRPs or a list of cells for paging the first UE.

22. The method of claim 12, further comprising:
receiving mobility history information from the first UE, the mobility history information indicating a time the first UE spent using at least one of:
the one or more first TRPs;
the one or more first SSB indices; or
the one or more first SSB beams; and
send the mobility history information to an access and mobility management function (AMF) or a second RAN for paging the UE.

* * * * *